(12) United States Patent
Chen et al.

(10) Patent No.: US 10,184,506 B2
(45) Date of Patent: Jan. 22, 2019

(54) CAPTIVE ELEMENTS OF AN ATTACHMENT SYSTEM

(71) Applicant: Apple Inc., Cupertino, CA (US)

(72) Inventors: Hsiang Hung Chen, Shenzhen (CN); Motohide Hatanaka, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 360 days.

(21) Appl. No.: 14/641,218

(22) Filed: Mar. 6, 2015

(65) Prior Publication Data
US 2016/0069371 A1 Mar. 10, 2016

Related U.S. Application Data

(60) Provisional application No. 62/048,248, filed on Sep. 9, 2014.

(51) Int. Cl.
*F16B 2/14* (2006.01)
*F16B 21/12* (2006.01)
(Continued)

(52) U.S. Cl.
CPC .......... *F16B 21/12* (2013.01); *A44B 11/2596* (2013.01); *A44B 11/263* (2013.01);
(Continued)

(58) Field of Classification Search
CPC .... F16B 2/04; F16B 2/14; F16B 17/00; F16B 21/12; F16B 21/125; G04B 37/1486;
(Continued)

(56) References Cited

U.S. PATENT DOCUMENTS 2,126,263 A 8/1938 Kestenman
2,346,887 A 4/1944 Winkler
(Continued)

FOREIGN PATENT DOCUMENTS

CH 694393 A5 12/2004
CN 2052214 2/1990
(Continued)

OTHER PUBLICATIONS

"Consumer Product Safety Act", (Public Law 92-573; 86 Stat. 1207, Oct. 27, 1972); https://www.cpsc.gov/PageFiles/105435/cpsa.pdf?epslanguage=en site visited on Apr. 27, 2018.*
(Continued)

*Primary Examiner* — Ryan D Kwiecinski
(74) *Attorney, Agent, or Firm* — Morgan, Lewis & Bockius LLP

(57) ABSTRACT

Embodiments described herein may be directed to an attachment system for coupling an accessory or component to a consumer product. The attachment system may include a captive locking mechanism that may be incorporated with the accessory or non-product side attachment assembly. The captive locking mechanism may include one or more spring-bar components that retain the engagement mechanism in a recess or feature formed in a component of the accessory. The attachment system may also include a release mechanism that may be incorporated with the product-side attachment assembly of a consumer product. The release mechanism may be captive or otherwise retained in the body of the device and may include one or more spring-bar components that retain the release mechanism in a recess or featured formed into the body of the device.

20 Claims, 27 Drawing Sheets

(51) Int. Cl.
*G04B 37/14* (2006.01)
*A44B 11/25* (2006.01)
*A44C 5/14* (2006.01)
*A44B 11/26* (2006.01)

(52) U.S. Cl.
CPC .............. *A44C 5/14* (2013.01); *F16B 2/14* (2013.01); *G04B 37/1486* (2013.01)

(58) Field of Classification Search
CPC ..... A44B 11/2596; A44B 11/263; A44C 5/14; A44C 5/147; A44C 5/2085; Y10T 24/45785; Y10T 403/59; Y10T 403/599; Y10T 403/60; Y10T 403/602
USPC .............. 368/281–283; 403/321, 326, 329; 24/265 B–265 WS; 224/164–179
See application file for complete search history.

(56) References Cited

U.S. PATENT DOCUMENTS

| | | | |
|---|---|---|---|
| 2,408,279 A | 9/1946 | Valcourt | |
| 2,505,044 A | 4/1950 | Heinrich | |
| 2,518,551 A | 8/1950 | Jaccarino | |
| 2,775,861 A | 1/1957 | Fachon | |
| 3,293,714 A | 12/1966 | Shafer | |
| 3,376,616 A | 4/1968 | Kaczorowski | |
| 3,589,341 A | 6/1971 | Krebs | |
| 3,675,284 A | 7/1972 | Rieth | |
| 3,747,171 A | 7/1973 | Montague, Jr. | |
| 4,068,355 A | 1/1978 | Rey | |
| 4,178,751 A | 12/1979 | Liautaud | |
| 4,217,681 A | 8/1980 | Grohoski et al. | |
| 4,234,115 A * | 11/1980 | Williams ............... A44C 5/145 224/168 | |
| 4,249,267 A | 2/1981 | Voss | |
| 4,401,388 A | 8/1983 | Mearns | |
| 4,414,714 A | 11/1983 | Kostanecki et al. | |
| 4,432,655 A | 2/1984 | Wollman | |
| 4,447,238 A | 5/1984 | Eldridge, Jr. | |
| 4,502,191 A | 3/1985 | Savage | |
| 4,615,185 A | 10/1986 | Bollinger | |
| 4,624,033 A | 11/1986 | Orton | |
| 4,648,161 A | 3/1987 | Rosen | |
| 4,941,236 A | 7/1990 | Sherman et al. | |
| 5,130,899 A | 7/1992 | Larkin et al. | |
| 5,146,437 A | 9/1992 | Boucheron | |
| 5,181,192 A * | 1/1993 | Paratte ................... G04C 3/008 368/204 | |
| 5,189,763 A | 3/1993 | Voumard | |
| 5,244,134 A | 9/1993 | Riley | |
| 5,305,503 A | 4/1994 | Yamagata | |
| 5,307,582 A | 5/1994 | Quintel | |
| 5,400,870 A | 3/1995 | Inoue | |
| 5,471,716 A | 12/1995 | Takahashi | |
| 5,522,529 A | 6/1996 | Yurman et al. | |
| 5,668,784 A | 9/1997 | Iguchi | |
| 5,711,056 A | 1/1998 | Taguchi et al. | |
| 5,788,400 A | 8/1998 | Wey | |
| 5,899,369 A | 5/1999 | Macripo | |
| 5,914,913 A | 6/1999 | Shriqui | |
| 5,930,873 A | 8/1999 | Wyser | |
| 5,991,978 A | 11/1999 | Nussbaum | |
| 6,014,793 A * | 1/2000 | Howald ................. A44C 5/147 24/115 G | |
| 6,067,692 A | 5/2000 | Chang | |
| 6,163,938 A | 12/2000 | Weber-Unger | |
| 6,168,055 B1 | 1/2001 | Grados | |
| 6,170,131 B1 | 1/2001 | Shin | |
| 6,179,025 B1 | 1/2001 | Sutton | |
| 6,292,985 B1 | 9/2001 | Grunberger | |
| 6,311,373 B1 | 11/2001 | Hashimoto | |
| 6,505,385 B2 | 1/2003 | Grunberger | |
| 6,588,069 B2 | 7/2003 | Deriaz et al. | |
| 6,598,271 B2 | 7/2003 | Nire | |
| 6,606,767 B2 | 8/2003 | Wong | |
| 6,631,669 B2 | 10/2003 | Weldle | |
| 6,647,597 B2 | 11/2003 | Reiter | |
| 6,678,898 B2 | 1/2004 | Jones et al. | |
| 6,701,580 B1 | 3/2004 | Bandyopadhyay | |
| 6,712,501 B2 | 3/2004 | Kinkio et al. | |
| 6,726,070 B2 | 4/2004 | Lautner | |
| 6,746,058 B2 | 6/2004 | Kienzler | |
| 7,243,824 B2 | 7/2007 | Tabata | |
| 7,363,687 B2 | 4/2008 | Kraus et al. | |
| 7,373,696 B2 | 5/2008 | Schoening et al. | |
| 7,380,979 B2 * | 6/2008 | Hiranuma ................. A44C 5/14 224/180 | |
| 7,451,528 B2 * | 11/2008 | Sima ......................... A44C 5/14 24/265 B | |
| 7,509,712 B2 | 3/2009 | Sima | |
| 7,526,840 B2 | 5/2009 | Pernu et al. | |
| 7,640,632 B2 | 1/2010 | Lazarus | |
| 7,806,309 B2 | 10/2010 | Korchmar | |
| 7,882,601 B2 | 2/2011 | Nguyen | |
| 7,900,754 B2 | 3/2011 | Carlson | |
| 7,905,039 B2 | 3/2011 | Karovic | |
| 8,091,261 B2 | 1/2012 | Chadwick | |
| 8,191,209 B2 | 6/2012 | Wolfgang | |
| 8,196,935 B2 * | 6/2012 | Lin ...................... B23B 31/1071 279/2.01 | |
| 8,235,585 B2 | 8/2012 | Speichinger | |
| 8,240,011 B2 | 8/2012 | Chevrolet | |
| 8,261,416 B2 | 9/2012 | Rothbaum et al. | |
| 8,316,515 B2 | 11/2012 | Slank | |
| 8,471,658 B2 | 6/2013 | Fullerton et al. | |
| 8,486,481 B2 | 7/2013 | Giuseppin et al. | |
| 8,573,458 B1 | 11/2013 | Hamilton | |
| 8,578,569 B1 | 11/2013 | Karnoski et al. | |
| 8,615,849 B2 | 12/2013 | Rothbaum | |
| 8,671,725 B2 | 3/2014 | Nicoara | |
| 8,787,006 B2 | 7/2014 | Golko et al. | |
| 8,789,246 B2 | 7/2014 | Yliluoma et al. | |
| 8,844,100 B2 | 9/2014 | Humphries et al. | |
| 8,967,437 B2 | 3/2015 | Wilson | |
| 9,003,611 B2 | 4/2015 | Catanese | |
| 9,049,894 B2 | 6/2015 | Wong | |
| 9,357,817 B2 | 6/2016 | Lee et al. | |
| 9,392,829 B2 | 7/2016 | Manuello | |
| 9,877,549 B2 * | 1/2018 | Perkins ............... A44B 17/0011 | |
| 2003/0116596 A1 | 6/2003 | Terasawa | |
| 2005/0102802 A1 | 5/2005 | Sitbon et al. | |
| 2005/0265132 A1 * | 12/2005 | Ho ...................... G04B 37/1486 368/282 | |
| 2006/0156520 A1 | 7/2006 | Meranto | |
| 2006/0186150 A1 | 8/2006 | Willows et al. | |
| 2006/0254105 A1 | 11/2006 | Chang | |
| 2007/0028429 A1 | 2/2007 | Ishida | |
| 2009/0133438 A1 | 5/2009 | Stampfli et al. | |
| 2009/0265832 A1 | 10/2009 | Clement | |
| 2010/0200627 A1 | 8/2010 | Shen | |
| 2010/0258601 A1 | 10/2010 | Thrope | |
| 2011/0083254 A1 | 4/2011 | Trutna et al. | |
| 2011/0226823 A1 | 9/2011 | Jasa | |
| 2011/0309121 A1 | 12/2011 | Dooley et al. | |
| 2012/0044031 A1 | 2/2012 | Ninomiya | |
| 2012/0055212 A1 | 3/2012 | Nicoara | |
| 2012/0216374 A1 | 8/2012 | Manuello | |
| 2013/0086774 A1 | 4/2013 | Krasinski et al. | |
| 2013/0205476 A1 | 8/2013 | Gentile et al. | |
| 2013/0286796 A1 * | 10/2013 | Chatelain ........... G04B 37/0008 368/282 | |
| 2013/0305780 A1 | 11/2013 | Christ | |
| 2013/0326790 A1 | 12/2013 | Cauwels et al. | |
| 2014/0083133 A1 | 3/2014 | Lee et al. | |
| 2015/0174854 A1 * | 6/2015 | Siahaan ................. B32B 5/024 428/212 | |
| 2015/0181749 A1 | 6/2015 | Gong | |
| 2016/0003269 A1 | 1/2016 | Russell-Clarke et al. | |
| 2016/0010673 A1 | 1/2016 | Russell-Clarke et al. | |
| 2016/0025119 A1 | 1/2016 | Russell-Clarke et al. | |
| 2016/0037870 A1 | 2/2016 | Perkins et al. | |
| 2016/0037876 A1 | 2/2016 | Perkins et al. | |

(56) References Cited

U.S. PATENT DOCUMENTS

| | | | |
|---|---|---|---|
| 2016/0037877 A1* | 2/2016 | Perkins | A44C 5/14 224/164 |
| 2016/0037878 A1 | 2/2016 | Yabe et al. | |
| 2016/0040695 A1 | 2/2016 | Perkins et al. | |
| 2016/0040698 A1* | 2/2016 | Perkins | A44B 17/0011 24/664 |
| 2016/0069371 A1* | 3/2016 | Chen | F16B 21/12 403/326 |
| 2016/0233034 A1 | 8/2016 | Sheng | |
| 2017/0181510 A1* | 6/2017 | Novak | A44C 5/147 |
| 2017/0265607 A1* | 9/2017 | Hatanaka | G04B 37/1486 |
| 2018/0011448 A1* | 1/2018 | Von Allmen | G04B 37/18 |
| 2018/0090890 A1* | 3/2018 | Kallman | H01R 13/18 |

FOREIGN PATENT DOCUMENTS

| | | |
|---|---|---|
| CN | 1147358 | 4/1997 |
| CN | 3118417 | 8/1999 |
| CN | 3184158 | 4/2001 |
| CN | 3210240 | 11/2001 |
| CN | 3229132 | 3/2002 |
| CN | 2575724 | 9/2003 |
| CN | 1181412 C | 12/2004 |
| CN | 2706786 Y | 6/2005 |
| CN | 200983868 | 12/2007 |
| CN | 101535920 A | 9/2009 |
| CN | 201446979 U | 5/2010 |
| CN | 101843393 A | 9/2010 |
| CN | 201709560 | 1/2011 |
| CN | 102202533 | 9/2011 |
| CN | 202026953 | 11/2011 |
| CN | 102282525 A | 12/2011 |
| CN | 202060129 U | 12/2011 |
| CN | 102392556 | 3/2012 |
| CN | 102576213 A | 7/2012 |
| CN | 202587325 | 12/2012 |
| CN | 202664274 | 1/2013 |
| CN | 202704189 | 1/2013 |
| CN | 202850585 U | 4/2013 |
| CN | 3329483 | 12/2013 |
| CN | 103488076 | 1/2014 |
| CN | 203435257 U | 2/2014 |
| CN | 103670062 A | 3/2014 |
| CN | 103802695 A | 5/2014 |
| CN | 103895602 A | 7/2014 |
| EP | 2098131 | 3/2009 |
| EP | 2141554 A2 | 1/2010 |
| FR | 1291875 | 4/1962 |
| FR | 2492238 | 4/1982 |
| FR | 2532239 | 3/1984 |
| GB | 207935 A | 12/1923 |
| GB | 464417 | 4/1937 |
| GB | 865498 A | 4/1961 |
| GB | 1491532 | 11/1977 |
| GB | 2113975 | 8/1983 |
| GB | 2355281 | 4/2001 |
| HK | 0501949.8 | 8/2005 |
| HK | 1001605.7 | 9/2010 |
| JP | S60178382 A | 9/1985 |
| JP | S 63-187913 U | 12/1988 |
| JP | H-06-62387 | 3/1994 |
| JP | 3753756 B | 3/2006 |
| JP | 2013254878 A | 12/2013 |
| TW | 440751 B | 6/2001 |
| TW | M380273 U | 5/2010 |
| TW | 201336387 A | 9/2013 |
| WO | WO2010/036090 | 4/2010 |
| WO | WO2011/0048344 | 4/2011 |
| WO | WO2012/160195 | 11/2012 |
| WO | WO-2013/140080 A1 | 9/2013 |

OTHER PUBLICATIONS

Author Unknown, Boucheron Paris, Reflect Collection, http://us.boucheron.com/en_us/the-creations/watches/reflet.html, 4 pages, at least as early as Apr. 10, 2015.

Korean Office Action from Korean Patent Application No. 20-2016-0001398, dated Sep. 19, 2017.

Taiwanese Office Action from Taiwanese Patent Application No. 105205763E01, dated Apr. 19, 2017.

Author Unknown, "Ikepod Wristwatches by Mark Newson," http://www.dezeen.com/2007/12/10/ikepod-wristwatches-by-marc-newson/, 32 pages, Dec. 10, 2007.

Author Unknown, "Tajan," http://www.tajan.com/pdf/7812.pdf, 2 pages, Dec. 10, 2007.

Author Unknown, v2.0 Ikepod Has Landed . . . again . . . , http://gp.granularit.com/media/38876/QP24_Ikepod.pdf, 3 pages, at least as early as Apr. 25, 2015.

Chinese Action from Chinese Patent Application No. 201510485843.X, dated Aug. 21, 2017.

Chinese Office Action from Chinese Patent Application No. 201510485843.X, dated May 17, 2018, 17 pages.

Chinese Office Action from Chinese Patent Application No. from 201510490138.9, dated Jun. 5, 2018, 22 pages.

* cited by examiner

SECTION C-C

SECTION D-D

SECTION C-C

SECTION C-C

SECTION C-C

SECTION C-C

SECTION C-C

SECTION A-A

SECTION A-A

SECTION A-A

SECTION B-B

SECTION B-B

CAPTIVE ELEMENTS OF AN ATTACHMENT SYSTEM

CROSS-REFERENCE TO RELATED APPLICATIONS

This application is a nonprovisional patent application of and claims the benefit under 35 U.S.C. § 119(e) of U.S. Provisional Patent Application No. 62/048,248, filed on Sep. 9, 2014, and titled "Attachment Systems for Consumer Products," the disclosure of which is hereby incorporated by reference herein in its entirety.

TECHNICAL FIELD

The present disclosure is generally directed to an attachment system for coupling two objects together and, more specifically, to an attachment system including a captive button with one or more spring bars.

BACKGROUND

Consumer products such as watches, cameras, phones, purses, and glasses may include one or more accessories attached thereto. The manner in which they are attached may be widely varied. However, they typically suffer from similar, if not the same, drawbacks. For example, many consumer products typically do not include user-friendly attachment systems. Some may require special tools and others may even require taking the consumer product into a shop in order to remove, fix or replace the accessories.

In one example, wristwatches typically include a case and a band. The case carries the watch mechanisms including the watch face. The band extends away from the case so that it can wrap around the wrist of a user. The band may be integral with the case. However, in most cases, the band is a separate part that is attached to the case. For example, the case may include a pin that captures the band thereby attaching the band to the case. In order to detach the band from the case, the pin needs to be removed. In some instances, band removal can be accomplished with a special tool. However, in many cases, the user may need to visit a specialty store or have the assistance of technician in order to remove the band.

In another example, a pair of glasses, such as, electronic glasses, sunglasses and the like, may have temples or stems that extend from a frame. These temples or stems may be coupled to the frames by a screw, a pin or other such mechanism. However, like the wristwatch, a special tool may be required to remove and/or secure the temples or stems to/from the frame.

In still yet another example, other electronic devices may be coupled to a lanyard or other type of band. For example a camera, a remote control, a game controller and the like may have a lanyard that is attached to a housing. However, it may be difficult to attach the lanyard to the housing as a portion of the lanyard is typically required to be inserted into a small opening within the housing. In this example, as with the other examples discussed above, the lanyard, accessory, object or article may not be attached to the electronic device or consumer product in a manner that facilitates user removal of the component.

It is with respect to these and other general considerations that embodiments have been made. Although relatively specific problems have been discussed, it should be understood that the embodiments should not be limited to solving the specific problems identified in this background.

SUMMARY

Embodiments described herein may be directed to an attachment system for coupling an accessory or component to a consumer product. The attachment system may include a captive locking mechanism that may be incorporated with the accessory or non-product side attachment assembly. The captive locking mechanism may be configured to engage a corresponding feature of a product-side attachment assembly of a consumer product. For example, if the consumer product is a wearable electronic device, such as a watch or other wrist-wearable device, the attachment system may be configured to attach a band or band assembly to the body or housing of the wearable electronic device. In some embodiments, the attachment system may include a captive locking mechanism integrated or incorporated with a removable module of the accessory. The captive locking mechanism may include one or more spring-bar components that anchor the engagement mechanism in a recess or feature formed in the removable module.

The attachment system may also include a release mechanism that may be incorporated with the product-side attachment assembly of a consumer product. The release mechanism may be configured to disengage or unlock the captive locking mechanism and facilitate removal of the removable module of the accessory. As described in more detail below, in some embodiments, the release mechanism may be captive or otherwise retained in the body of the device and may include one or more spring-bar components that anchor the release mechanism in a recess or featured formed into the body of the device.

Some example embodiments are directed to an attachment system of a consumer product. The system may include a removable module that is configured to slidably engage with a mating feature of the consumer product. The removable module may have an aperture formed therein for containing a locking mechanism. The locking mechanism may include a catch member that is disposed within the aperture of the removable module and configured to protrude from a first surface of the removable module. The locking mechanism may also include a ramp member disposed within the aperture and configured to protrude from a second surface of the removable module that is opposite to the first surface. One or more spring bars may be positioned within and span across a width of the aperture. A first spring may be coupled between the spring bar and the ramp member. The first spring may bias the ramp member away from the spring bar. A second spring may be coupled between the ramp member and the catch member. The second spring may bias the catch member away from the ramp member. In some embodiments, the consumer product is a wearable electronic device, and the removable module couples a band strap to the wearable electronic device.

In some embodiments, the catch member is configured to protrude outward from the aperture and engage a recess formed in the mating feature of the consumer product to retain the removable module with respect to the consumer product. In some cases, when the removable module is not engaged with the mating feature of the consumer product, the catch member is flush with or below the first surface, and a portion of the ramp member extends beyond the second surface. In some cases, when the removable module is partially engaged with the mating feature of the consumer product, the catch member is flush or below the first surface, and the ramp member is flush or below the second surface. In some cases, when the removable module is fully engaged with the mating feature of the consumer product, a portion of the catch member extends beyond the first surface and engages a recess formed in the mating feature, and the ramp member is flush or below the second surface.

In some embodiments, the spring bar includes a barrel portion and a spring-loaded protrusion that extends out from an end of the barrel portion. The spring-loaded protrusion may be configured to engage corresponding recess formed in a wall of the aperture.

In some embodiments, a retaining feature is formed within aperture and limits the outward movement of the ramp member. The retaining feature may include a protrusion that projects inward from a wall of the aperture.

In some embodiments, the ramp member includes a ramp-retaining feature that engages a catch-retaining of the catch member. In some cases, an engagement between the ramp-retaining feature and the catch-retaining feature limits the outward movement of the catch member.

In some embodiments, the mating feature of the consumer product includes an undercut or feature geometry that helps to retain the removable module within the feature. In some cases, the mating feature of the consumer product has an opening width at an opening of the feature and a maximum width within the feature being greater than the opening width. Similarly, the removable module may have a first portion having a first thickness that is smaller than the opening width of the opening and a second thickness that is less than the maximum width of the feature and greater than the opening width. In some cases, the opening width of the mating feature is configured to limit the movement of the removable module in a direction perpendicular to opening.

Some example embodiments are directed to an attachment system of an consumer product including a release mechanism for disengaging the removable module. The system may include a housing of the consumer product having a channel formed therein. The system may also include a removable module that is configured to slidably engage with the channel of the housing. The removable module may include a catch member that retains the removable module within the channel. The system may also include a release mechanism that is configured to release the catch. The release mechanism may be disposed within an aperture in a wall of the channel. The release mechanism may include a button member at least partially disposed within the aperture and configured to move up and down within the aperture. The release mechanism may also include a spring bar positioned within and spanning across a width of the aperture. The spring bar may be received by a feature formed in the button member and the spring bar may limit motion of the button member. In some cases, the feature formed in the button member is a slotted hole and the spring bar guides the button member by slidably engaging the slotted hole.

In some embodiments, a spring may be positioned between the button member and a feature formed into the body. The spring may be configured to bias the button away from the channel. In some embodiments, the button member includes an actuation portion and a plunger portion. The plunger portion may be configured to disengage the catch member from a recess when the actuation portion is pushed. the recess may be formed in a wall of the channel. In some embodiments, the plunger portion is configured to be flush or extend into the recess when the button member is pushed.

Some example embodiments are directed to a method of installing or assembling a locking mechanism in a removable module of an accessory. The method may include positioning at least one spring bar with respect to a ramp member. A first spring may be disposed between the ramp member and the at least one spring bar. The method also includes positioning a catch member with respect to the ramp member. A second spring may be disposed between the catch member and the ramp member. The at least one spring bar of the locking mechanism may be compressed and the components may be inserted into an aperture formed in the removable module. The at least one spring bar may be engaged within a recess formed in a wall of the aperture.

Some example embodiments are directed to a method of attaching the accessory into a consumer product using the removable module. The removable module of the accessory may be inserted into a channel of the consumer product. A side force may be applied to the removable module to slide the removable module further into the channel. As the removable module is slid into the channel, the ramp member of the locking mechanism may be compressed using the channel. The catch member of the locking mechanism may engage with a recess formed into a wall of the channel. Engagement between the catch member and the recess may prevent the removable module from sliding within the channel. In some cases, as the ramp member is compressed, a spring provides an outward bias force on the catch member pushing the catch member toward a wall of the channel. When the catch member engages the recess, the outward bias force may maintain the catch member in an extended position.

Some example embodiments are directed to a method of detaching the accessory from the consumer product. For example a release mechanism may be actuated by applying a force to an actuation portion of the release mechanism. The catch member may be expelled from the recess using a plunger portion that is coupled to the actuation portion of the release mechanism. A side force may be applied to the removable module to slide the removable module within the channel. The removable module may then be removed from the channel. In some cases, removing the removable module from the channel results in an extension of the ramp member from removable module. In some cases, removing the removable module from the channel results in the catch member being substantially flush with a surface of the removable module.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
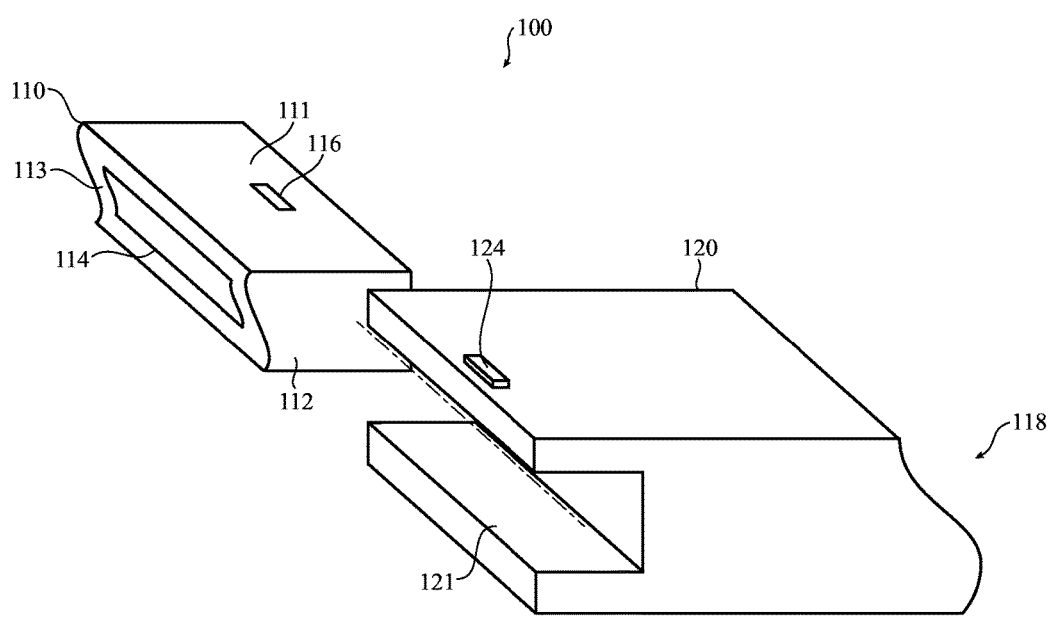
FIG. 1A illustrates an exemplary consumer product and an attachment system according to one or more embodiments of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Provided herein is an attachment system for a consumer product. The attachment system may include a removable module that interfaces with some portion of the consumer product. For example, the removable module may engage with a related or corresponding module, recess, aperture or component of, or associated with, the consumer product. When engaged, the removable module may be carried by the consumer product. For example, when the removable module is engaged with the consumer product, the module and the consumer product may become an integrated unit. In some cases, the removable module can extend the functionality of the consumer product. That is, the attachment system and/or the removable module can provide additional operability to the consumer product. Additionally or alternatively, the removable module may be used as an accoutrement to the consumer product. For example, the removable module may add an aesthetic or structural enhancement to the consumer product. Additionally or alternatively, the removable module may be configured to couple another object or article to the consumer product. For example, the object may be an accessory such as a cover, skin, plate, lanyard, band, strap, dock and/or the like. In all of these examples, the interface between the removable module and the consumer product may be a standard interface such that different functionality, accoutrements, and objects can be coupled to the consumer product.

The consumer product that may be used in conjunction with the attachment system can be widely varied. By way of example and not by way of limitation, the consumer product may be an electronic device, a mechanical device, an electromechanical device and the like. In one example, the consumer product is a portable consumer product. In another example, the consumer product is a wearable product. Additional and more specific examples of the consumer product include mobile phones, personal digital assistants, music players, mechanical timekeeping devices, electromechanical timekeeping devices, health monitoring devices, tablet computers, laptop computers, glasses (electronic or otherwise), portable storage devices and the like. Although the examples above include electronic devices, the attachment system of the present disclosure may be used with non-electronic devices.

The attachment system can also be widely varied. In one embodiment, the attachment system may have a tool-less design such that a special tool is not needed to connect and/or disconnect the attachment system from the consumer product. As a tool may not be required, the attachment system may be easy to use and intuitive. Additionally or alternatively, a tool or other component, such as a component of the consumer product to which the attachment system is coupled, may be configured to actuate a button or other component of the attachment system to secure and/or release the attachment system from the consumer product.

Although a tool may not be required to secure and/or release the attachment system from the consumer product, the attachment system of the present disclosure is robust and provides a retention force that enables the attachment system to be securely coupled to the consumer product. Although the attachment system is robust, as will be discussed below and shown in the figures, the attachment system may have a low profile thereby enabling the consumer product to maintain a desirable or particular shape.

As will also be described below, the attachment system of the present disclosure typically includes a product-side attachment assembly and a non-product side attachment assembly that can engage and disengage to and from one another. Each of these assemblies may, for example, include a lug portion that physically interface with one another in order to secure the two assemblies together. The assemblies may also releasably interface with one another in order to free the assemblies from each other.

The attachment system may include a captive locking mechanism that may be incorporated with the non-product side attachment assembly. The captive locking mechanism may be configured to engage a corresponding feature of a product-side attachment assembly of a consumer device. For example, if the consumer device is a wearable electronic device, such as a watch or other wrist-wearable device, the attachment system may be configured to attach a band assembly to the body of the wearable electronic device. The band assembly may include one or more straps and a clasp that can be used to secure the wearable electronic device to the wrist of a user. In this case, the attachment system may include a captive locking mechanism that is incorporated with the band assembly and is configured to engage a corresponding feature formed in or incorporated with the body of the wearable electronic device. In some cases, the locking mechanism secures or locks the band assembly to the body of the wearable electronic device. As described in more detail below, in some embodiments, the captive locking mechanism may include one or more spring-bar components that anchor the engagement mechanism in a recess or feature formed in a component of the band assembly.

The attachment system may also include a release mechanism that may be incorporated with the product-side attachment assembly of a consumer device. For example, if the consumer device is a wearable electronic device, a release mechanism may be integrated with or incorporated into the body of the device. The release mechanism may be configured to disengage or unlock the captive locking mechanism and facilitate removal of a band assembly or other component. As described in more detail below, in some embodiments, the release mechanism may be captive or otherwise retained in the body of the device and may include one or more spring-bar components that anchor the release mechanism in a recess or featured formed into the body of the device.

In some embodiments, the attachment system includes a removable module of the non-product assembly that mechanically or slidably engages/disengages a component of the consumer product. In one example, the component may be the housing or enclosure of the consumer product and the removable module may include a removable lug that forms part of a band assembly. In some cases, the band assembly includes at least one strap and a clasp that are configured to attach the consumer product to the wrist of a user.

In some embodiments, the removable module of the attachment system may be configured to be inserted into an opening on the consumer product. Once the removable module, has been inserted into the opening, the removable module may slide within the opening of the consumer product. For example, the consumer product may have a channel that is disposed on one or more sides of a housing of the consumer product. The channel may be configured to receive a portion, such as an end portion, of the removable module of the attachment system. Once the end portion of the removable module has been inserted into the channel, the removable module may slide further into the channel. The sliding motion of the removable module may continue until the removable module is secured or otherwise coupled to or within the channel. Just as the removable module is configured to slide into the channel of the consumer product, the removable module may also slide out of the channel of the consumer product. Thus, the removable module may be easily inserted into and removed from the consumer product.

In some embodiments, opening or channel of the attachment system may be shaped to retain the removable module. For example, the opening or channel may include an undercut or narrowed portion that mechanically engages the removable module to retain the removable module in the opening or channel. As such, when the removable module is placed within the receiving module of the consumer product, the removable module may be integrated (either partially or entirely) with the consumer product.

The attachment system may also be used to secure various accessories to the consumer product. For example, an accessory, article or object may be coupled or otherwise attached to the removable module of the attachment system. Further, the accessory, article or object may be used to secure the consumer product to a user. In some cases, the consumer product may be configured to receive multiple different bands, accessories and the like. The consumer product, and the associated bands, may each include a common node (e.g., a removable module) that couples to a corresponding node (e.g., an opening or channel) associated with the consumer product. Accordingly, the consumer product may have a plurality of accessories or bands that may be interchangeable thereby providing a user many different aesthetic looks for the consumer product. More specifically, the consumer product may be configured to receive a first band, and second band which is different than the first band. Further, each of the first band and the second band may include a common node that couples to, or is received by, a corresponding node in the consumer product. Thus, each band may be interchangeable with respect to one another and with other bands and/or accessories.

Furthering the example from above, a band assembly or strap may be removably coupled to the attachment system and may further be used to secure the consumer product to the user. Because the attachment system is removably coupled to both the housing of the consumer product and a band or strap, the attachment system itself, or the band or strap, may be interchangeable with numerous other bands having different materials, designs and configurations.

In one particular embodiment, the consumer product is a portable electronic device. More specifically, the consumer product is may be a wearable consumer product. A wearable consumer product is one that can be worn by or otherwise secured to a user. For example, the wearable electronic device may include, but is not limited to a wearable computer, a wearable watch, a wearable communication device, a wearable media player, a wearable health monitoring device, and/or the like. In cases such as these, the attachment system may be used to couple a band, a strap, a sleeve or various types of clothing to the wearable consumer product. For example, in the case of a wrist worn product, the removable module of the attachment system may couple the device to a band that can be wrapped around and secured to a user's wrist when the removable module is attached to the wearable product. It should be appreciated, however, that this embodiment is not a limitation.

In certain embodiments, the band, the attachment system and/or portions of each may be made up of a variety of different materials and/or configurations. In certain embodiments, the band and/or the attachment system, may be made from rubber, metal, woven fiber, leather, rubber overlaying a woven mesh, silicon, Milanese mesh, and so on. In some embodiments, a first band, or a first portion of a first band may be made up of a first material and a second bad, or a second portion of the first band, may be made from a second different material. The band may also be made up of a plurality of links with the attachment system forming one or more of the links. As such, the band may be resizable by, for example, adding or removing links.

In some embodiments, the band may be coupled to a portion of the attachment system using a mechanical joint. For example the band may be attached to a removable module such as a lug using one or more pins, holes, adhesives, screws, and the like. In some embodiments, the band may be co-molded or overmolded with at least a portion of the removable module or lug. In some embodiments, the band is integrally formed with a feature that functions as the removable module or lug.

These and other embodiments are discussed below with reference to FIGS. 1-16. However, those skilled in the art will readily appreciate that the detailed description given herein with respect to these figures is for explanatory purposes only and should not be construed as limiting.

Figure 1B:
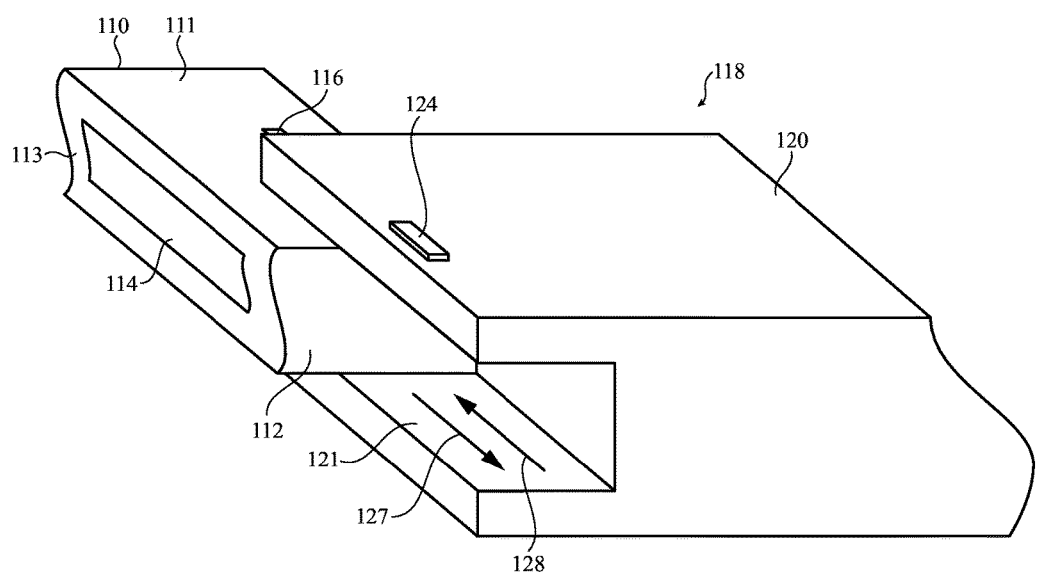
FIG. 1B illustrates an attachment system being inserted into a housing of a consumer product according to one or more embodiments of the present disclosure.
Figure 1C:
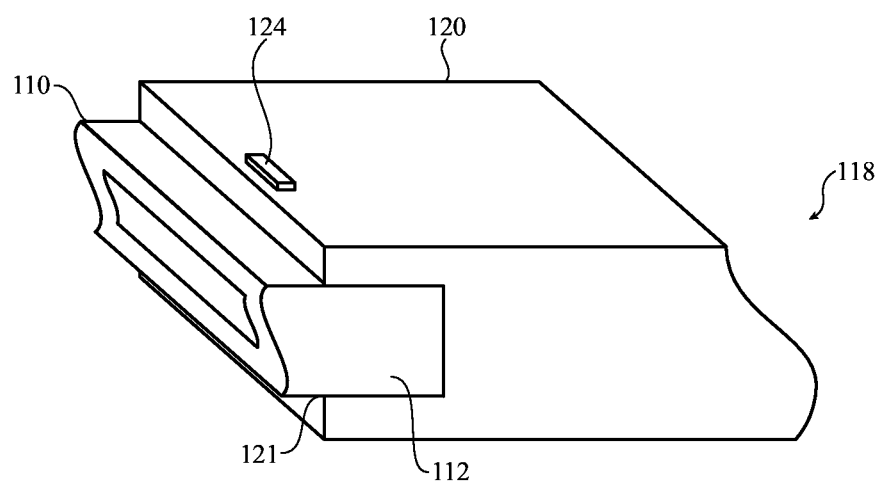
FIG. 1C illustrates the attachment system being fully inserted into a housing of a consumer product according to one or more embodiments of the present disclosure.

FIGS. 1A-C illustrate an exemplary attachment system 100 according to one or more embodiments of the present disclosure. The attachment system 100 may include a removable module 110 that interfaces with some portion of a consumer product 118. The removable module 110 may, for example, engage with a housing 120 of the consumer product 118. The housing 120 may include, for example: a housing portion of the consumer product, an extension of another part of the consumer product 118, a separate part fixed to a portion of the housing of the consumer product, and the like. In certain embodiments, the housing 120 may be used as a housing for various consumer products, electronic devices, mechanical devices and the like. Accordingly, the housing 120 may be referred to a housing 120 throughout this disclosure.

Non-limiting examples of consumer products include electronic devices, mechanical devices and so on. Mores specific examples include but are not limited to, a tablet computer, a timekeeping device, a mobile telephone, a portable music player, a personal digital assistant, glasses and the like. As such, the component or housing 120 may have various dimensions and shapes based on the anticipated use of the housing 120. Further, the housing 120 may include various openings and/or recesses (not shown) that may be used for buttons, display screens and the like. Depending on the intended use and desired durability of the housing 120, the housing 120 may be made of stainless steel, aluminum, plastic, gold, glass, platinum, or other such materials and combinations thereof.

The removable module 110 can be widely varied. The removable module may, for example, extend the functionality of the consumer product 118 (e.g., adding operational modules, electrical systems and the like). The removable module 110 may be used as an accoutrement to the consumer product thereby enhancing aesthetics of the consumer product 118. The removable module may also be configured to couple an object or other article to the consumer product 118. For example, the object may be a cover, skin, plate, lanyard, band, strap, and/or the like. The interface may be standard interface such that different objects can be attached to the consumer product 118 via the attachment system 100.

The removable module 110 may include a body 111 that is configured for insertion into a mating feature or channel 121 of the housing 120 of the consumer product 118. For example, FIG. 1A shows the removable module 110 outside of the channel 121 and FIG. 1C shows the removable module 110 inserted within the channel 121. When the removable module 110 is inserted into the channel 121, the removable module 110 is engaged with or otherwise secured to the consumer product 118 such that the consumer product 118 carries the removable module 110 (e.g., the two parts become an integrated unit).

In some embodiments, the shape of the body 111 of the removable module 110 may correspond to a shape of the channel 121. Furthermore, the length of the body 111, or the overall length of the removable module 110 may generally correspond to the length of the channel 121. In some cases, the ends of the removable module 110 may be flush or substantially flush with the surfaces of the housing 120 when fully engaged such as shown in FIG. 1C. However, the length of the removable module 110 may be less than or greater in length than the channel 121. Accordingly, the removable module 110 may jut from one or more sides of the channel 121.

The body 111 of the removable module 110 may be configured to engage the housing 120 by sliding within the channel 121 such as shown in FIG. 1B. Although not shown, a keying feature may be provided to ensure proper alignment between the removable module 110 and the housing 120. Furthermore, a retention feature such an undercut or flange may be provided to prevent disengagement in a direction that is perpendicular to the length of the channel 121. In some implementations, the channel 121 of the consumer product 118 may be dimensioned and shaped to provide sliding movement but not lateral movement perpendicular to the sliding direction. In some embodiments, the channel 121 may include a single open end for receiving the body 111. Alternatively, the channel 121 may include opposing open ends for receiving the body (as shown in FIGS. 1A-C).

In some embodiments, the removable module 110 may be manufactured from stainless steel, aluminum, plastic, or other such material. Although specific materials are mentioned, the removable module 110, and/or the components of the attachment system 100, may be manufactured from various other materials. Likewise, the housing 120 of the consumer product 118 may be made from similar or different materials or combinations of materials.

The body 111 of the removable module 110 may include a proximal end 112 and a distal end 113. In certain embodiments, the proximal end 112 and the distal end 113 of the removable module 110 may each have an arm that extends beyond a width of the body 111 (not shown). In other embodiments, the width of the removable module 110 may be uniform or substantially uniform. In certain embodiments, the removable module 110 may have one or more features, such as a recess 114, that is configured to receive an accessory, an object, an article and the like. For example, the recess 114 may be configured to receive a pin (not shown) or other connection mechanism that enables a strap or a band, such as, for example, band 422 (FIG. 4), or any other accessory device or component, to be removably attached to the removable module 110.

In embodiments, where the removable module 110 includes one or more arms, an inner side of each of the arms may include a recess. The recess may be used to couple or secure various accessories to the removable module 110. In another embodiment, the arms of the removable module 110 may include one or more protrusions that extend from the arms of the removable module 110. In such embodiments, an accessory may have one or more detents that are configured to mate with the protrusions. In yet another embodiment, the protrusions may be magnetized to enable a magnetic connection between the removable module 110 and the accessory. Although not specifically mentioned, other connection mechanisms may be used between the removable module 110 and the accessory. Examples include snaps, hooks and so on.

The body 111 of the removable module 110 may also include an opening or aperture (not shown) that extends from a top surface of the body 111 to a bottom side of the body 111. The opening may be configured to receive and secure a locking mechanism within the opening. As will be explained in greater detail below, the locking mechanism may include a spring-loaded locking mechanism that includes a catch member 116 and a ramp member (not shown). In some embodiments, the opening may partially extend through the body 111 of the removable module 110. An example locking mechanism is described in more detail below with reference to FIGS. 7A-B, 8A-B and 9A-C.

In some embodiments, the catch member 116 in the removable module 110 may have a top surface that is flush or substantially flush with respect to a top surface of the body 111 when the removable module 110 is not installed or assembled in the channel 121. In some cases, a lower ramp member (not shown), or the bottom portion of the locking mechanism, may be spring-biased proud with respect to a bottom surface of the body 111, such that a bottom surface of the ramp member extends or protrudes beyond the bottom surface of the body 111. In some implementations, as the lower ramp member is forced into the opening of the removable module 110, an internal spring of the locking mechanism may exert an outward force on the catch member 116, which may cause the catch member 116 to extend or protrude beyond the top surface of the body 111 and into a corresponding recess or aperture formed in a side wall of the channel 121. Although the catch member 116 is shown in the figures in a central location, the catch member 116 and the locking mechanism may be located at various positions on the body 111 of the removable module 110. In addition, a removable module 110 may have multiple locking assemblies placed at various locations along the body 111.

Because the locking mechanism may be spring-biased in a particular manner, such described below with respect to FIGS. 9A-C, when the ramp member contracts or is pushed into the opening, such as, for example, when the removable module 110 is being received into the channel 121 of a consumer product 118, the spring mechanisms within the locking mechanism cause the catch member 116 to move from a first position (e.g., the flush or substantially flush position) to a second position if available space within the channel permits the expansion. The second position is a position in which at least a portion of the catch member 116 extends beyond the top surface of the body 111. However, the catch member 116 will not move from the first position to the second position until the catch member 116 is in proximity to a recess formed within the channel 121 as the recess permits the expansion.

Once the catch member 116 is in proximity to the recess within the channel, the locking mechanism expands such that at least a portion of the catch member 116 extends from the body 111 and is received into the recess. Once the catch member is received into the recess, the removable module 110 is locked in place within the channel 121. In certain embodiments, the recess in the channel 121 is shaped and positioned in such a manner as to enable the catch member 116 to be received directly into the recess when the removable module 110 reaches a determined point within the channel. The determined point within the channel 121 may be when the body 111 of the removable module 110 is centered in the channel 121. In some cases, the determined point may be a location at which the proximal end 112 and the distal end 113 of the removable module 110 are flush or substantially flush with one or more sidewalls of the housing 120 and/or one or more openings of the channel 121.

To unlock and subsequently remove the removable module 110 from the housing 120, the housing 120 includes a release mechanism 124 that causes the catch member 116 to be displaced from the recess within the channel when the release mechanism 124 is actuated. Once the catch member 116 has been removed from the recess, the removable module 110 may be slide within, or removed entirely from, the channel 121.

When the removable module 110 is removed from the channel 121, the spring mechanisms within the locking mechanism cause the ramp member to expand or protrude outwardly from the opening in the body 111 of the removable module 110. As a result, the ramp member is again spring-biased proud with respect to the bottom surface of the body 111. The spring mechanisms that cause the ramp member to be biased proud with respect to the body 111 also causes the catch member 116 to be biased flush or substantially flush to the top surface of the body 111.

As discussed above, the housing 120 may include a channel 121 disposed along at least one side. Although a single channel 121 is shown in FIG. 1A, the housing 120 may have any number of channels 121 disposed on various sides. The channel 121 may include an opening at a distal end of the channel 121 and an opening at a proximal end of the channel such as shown in FIG. 1A. Although FIG. 1A depicts the channel 121 having openings at both a distal end and a proximal end, the channel 121 may have an opening at one end (e.g., the distal end) and be closed or solid at another end (e.g., the proximal end 112). In such embodiments, the removable module 110 may travel within the channel 121 until one end of the removable module 110 (e.g., the proximal end 112) comes into contact with the closed end of the channel 121.

Although the channel 121 and the button portion of the release mechanism 124 are shown having a particular shape and orientation, each of the above elements may have any shape and orientation. For example, the channel 121 may be rounded or polygonal. Further, the channel 121 may be orientated at any desired position and angle. Additionally, the button portion of the release mechanism 124 may have any desired shape and size and may be positioned at any desired location on the housing 120.

FIG. 1B illustrates the removable module 110 shown in FIG. 1A being partially inserted into the channel 121 of the housing 120 according to one or more embodiments of the present disclosure. As shown in FIG. 1B, the proximal end 112 of the removable module 110 may be inserted into an opening of the channel 121 of the housing 120 in the direction indicated by arrow 127. In the present embodiment, the removable module 110 may also be slid into the channel 121 from the opposite end as shown in FIG. 1B.

Although FIG. 1B shows the proximal end 112 of the removable module 110 being inserted into the opening of the channel 121 and sliding in the direction of arrow 127, the distal end 113 of the removable module 110 may be inserted into the channel 121 and may slide within the channel 121 in the direction indicated by arrow 128. However, regardless of the direction in which the removable module 110 is inserted into the channel 121, the removable module 110 is configured to slide within the channel 121 in either direction until the locking mechanism, and more specifically the catch member 116 of the locking mechanism, is received into the recess of the channel 121.

In some embodiments, as the removable module 110 is being inserted into the channel 121, a portion of channel 121 contacts the ramp member of the locking mechanism. Continued movement in the direction indicated by arrow 127 may cause the ramp member to be compressed or withdraw into in the body 111 of the removable module 110 until the locking mechanism enters a fully compressed state (e.g., a state in which the ramp member and the catch member 116 are both contained within the body 111 of the removable module 110 and both the ramp member and catch member 116 are prohibited from expanding).

FIG. 1C illustrates an attachment system 100 in which a removable module 110 is fully engaged with a housing 120 of a consumer product 118 according to embodiments of the present disclosure. In some embodiments, the removable module 110 is fully engaged with the housing 120 when the removable module 110 is centered within the channel 121. However, in other embodiments, the removable modules 110 may be fully engaged with the housing 120 is a position that is not centered with respect to the channel 121.

As also shown in FIG. 1C, when the removable module 110 has been fully inserted into the channel 121, a portion of the removable module 110 may extend in a direction that is perpendicular to the length of the channel 121. In other embodiments, there may be no lateral extension of the body 111. In still yet other embodiments, the removable module 110 may be flush or substantially flush with respect to the channel 121 or may be recessed within the channel 121. Likewise, each of the proximal end and the distal end of the removable module 110 may extend from, be flush or substantially flush, or be recessed from one or more edges or sidewalls of the housing 120 and/or one or more edges or sides of the channel 121. For example, a sidewall of the proximal end 112 of the removable module 110 and a sidewall of the distal end 113 of the removable module 110 may have a shape that is complimentary to the shape of the sidewall of the housing 120. Thus, when the removable module 110 is locked in place within the channel 121 of the housing 120, the sidewalls of the removable module 110 and the sidewalls of the housing 120 are flush and/or smooth with respect to one another. That is, the shape of the sidewall of the removable module 110 may match the shape, or otherwise is coordinated with, the sidewall of the housing 120.

In alternative embodiments, the proximal end 112 and the distal end 113 of the removable module 110 may protrude or extend from the housing 120 when the removable module 110 has been locked within or is otherwise engaged with the channel 121. Alternatively, the length of the channel 121 and/or the housing 120 may be longer than the length of the removable module 110. In such instances the proximal end 112 and the distal end 113 of the removable module 110 may be recessed within the channel 121 or the housing 120.

In some embodiments, the locking mechanism may engage with or lock to the housing 120 when the removable module 110 is fully engaged. For example, once the catch member 116 of the locking mechanism is in proximity to or beneath a recess in the channel 121, one or more spring mechanisms within the locking mechanism cause the catch member 116 of the locking mechanism to expand or protrude into the recess. More specifically, one or more springs in the locking mechanism may cause the catch member 116 to move from a first position, in which the catch member 116 is flush or substantially flush with respect to a top surface of the body 111 of the removable module 110, to a second position, in which at least a portion of the catch member 116 extends from the top surface of the body 111 and is received into the recess thereby preventing movement of the removable module 110 to the housing 120.

In some embodiments, once the removable modules 110 is fully engaged with the housing 120, the removable module is retained until released. In some instances, the locking mechanism of the removable module 110 may be released from the recess when a button portion of the release mechanism 124 of housing 120 is actuated. For example, a release mechanism 124, or portions of a release mechanism 124, may be located in the recess of the housing 120 above the catch member 116. When the button portion of the release mechanism 124 is pressed, a plunger of the release mechanism 124 may push or expel the catch member 116 of the locking mechanism out of the recess. Once the catch member 116 is no longer engaged with the recess, the removable module 110 may be once again slid within the channel 121.

In some embodiments, the housing 120 may not include a release mechanism 124. For example, the locking mechanism may be shaped such that when a force is applied to one end of the removable module 110, the force causes the removable module 110 to move in the direction of the applied force. As the removable module 110 moves, the locking mechanism contracts and disengaged. The contraction of the locking mechanism may continue as the removable module 110 moves in the direction of the applied force. As a result, the locking mechanism enters a compressed state (e.g., the locking mechanism is contained within the body 111 of the removable module 110). When the locking mechanism is in the compressed state, the removable module 110 may slide within the channel 121 such as described earlier.

Although not shown, the removable module 110 may have a band, strap or other such accessory, article or object removably coupled thereto. Although a band and a strap are specifically mentioned, the removable module 110 may be coupled to various accessories or devices. For example, the removable module 110 may be used to secure a clip, a lanyard a dock, a case, or a protective cover to the consumer product 118. In embodiments where the removable module 110 is used to couple a band, strap or other such accessory, article or object to the consumer product 118, the band or strap may be attached to the removable module 110 using a pin (not shown), a clasp (not shown), a snapping mechanism (not shown) or other type of attachment system. The band or strap may be used to secure the consumer product 118 to a user of the consumer product 118 or to an article of clothing, a stand, a display system, or any suitable item.

Although the removable module 110 and the channel 121 are shown having a particular shape in FIG. 1A-C, the removable module 110 and the channel may vary depending on the embodiment. For example, the body 111 of the removable module 110 may be rounded, squared, triangular and the like such as shown in FIG. 2A-F. Although a square sidewall and channel are shown in FIG. 1A-C, the sidewalls of the body 111 of the removable module 110 and the sidewalls of the component or housing 120, in particular the proximal and distal ends of the channel 121, may have any desired shape so long as the shapes are complimentary to one another.

Figure 2A:
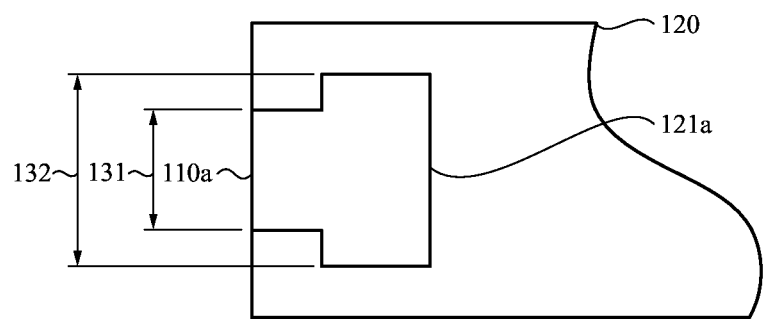
FIG. 2A-FIG. 2F illustrate side views of various locking configurations between an attachment system and a consumer product according to one or more embodiments of the present disclosure.
Figure 2B:
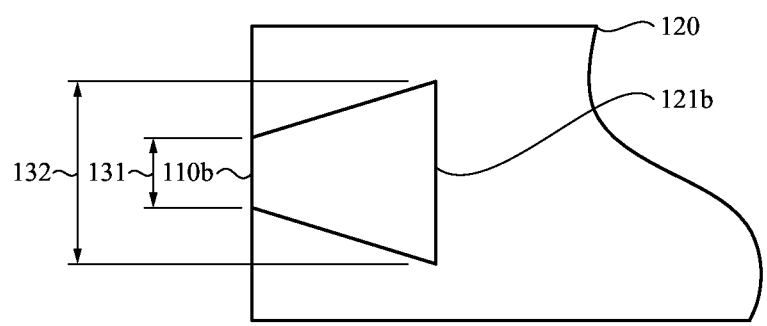
Figure 2C:
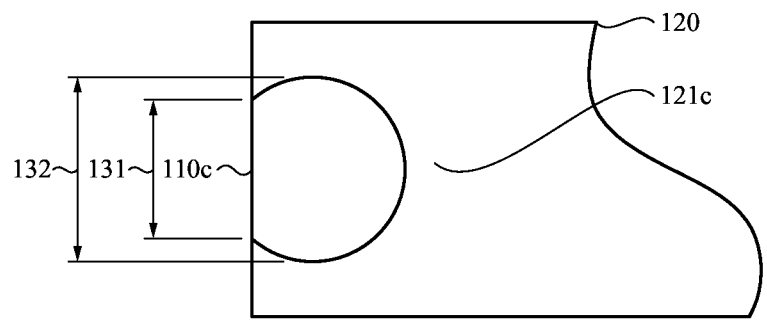
Figure 2D:
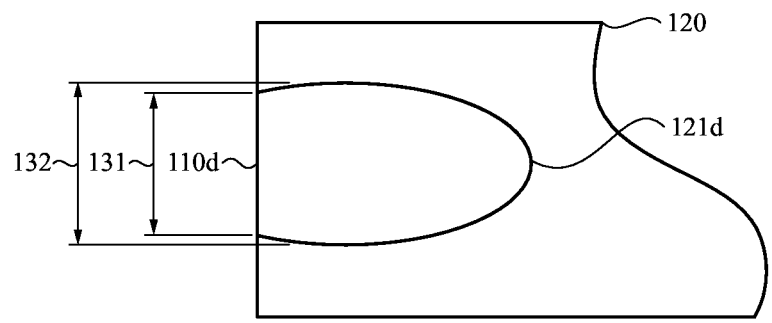
Figure 2E:
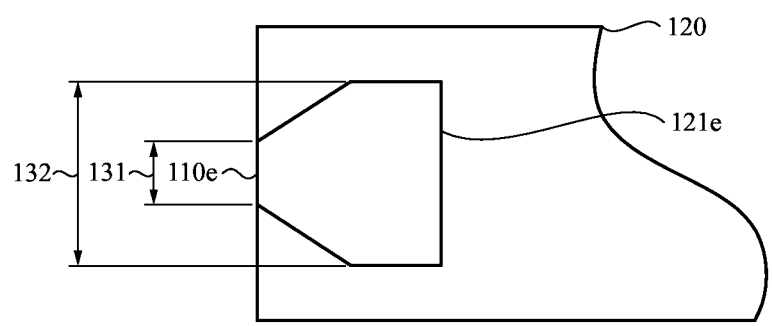
Figure 2F:
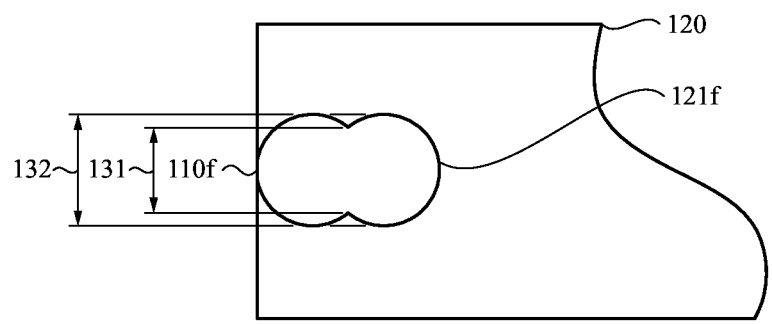

The particular shape of the channel 121a-f and the corresponding shape of the removable module 110a-f may include any one of a number of different shapes. For example, shown in FIG. 2A-FIG. 2F, the sidewalls of the proximal end and the distal end of the removable module 110a-f, as well as the sidewalls of the channel 121a-f may have one or more flanges (FIG. 2A), trapezoidal (FIG. 2B), curvilinear (FIG. 2C), oval (FIG. 2D), polygonal (FIG. 2E), as well as other desired shapes such as shown in FIG. 2F. Likewise, the attachment system may be arranged in any desired orientation within the housing 120.

As shown in FIGS. 2A-F, the channel 121a-f may have an undercut that is configured to retain the removable module 110a-f within the channel 121a-f. As shown in FIGS. 2A-F, the channel 121a-f of the consumer product has an opening width 131 at the opening of the channel 121a-f and a maximum width 132 within the channel 121a-f. In some embodiments, the maximum width 132 is greater than the opening width 131 to form an undercut. Similarly, the removable module 110a-f may have a has a first portion with a first thickness that is smaller than the opening width 131 of the channel 121a-f and a second thickness that is less than the maximum width 132 of the channel 121a-f and also greater than the opening width 131. Thus, due to the undercut formed by the channel, the opening width of the channel 121a-f may be configured to limit the movement of the removable module 110a-f in a direction perpendicular to opening.

Figure 3A:
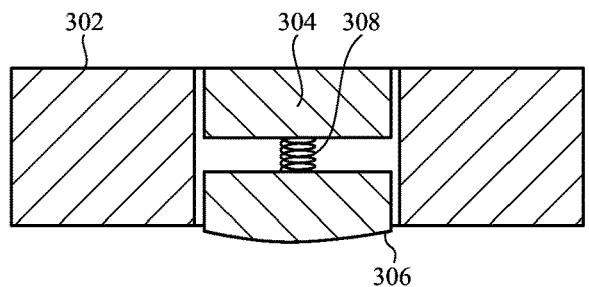
FIG. 3A illustrates a block diagram of an attachment system according to one or more embodiments of the present disclosure.
Figure 3B:
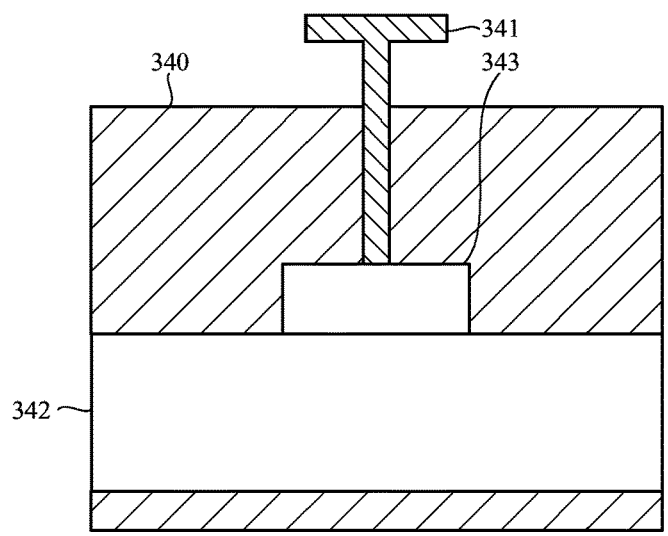
FIG. 3B illustrates a block diagram of a housing of a consumer product according to one or more embodiments of the present disclosure.
Figure 3C:
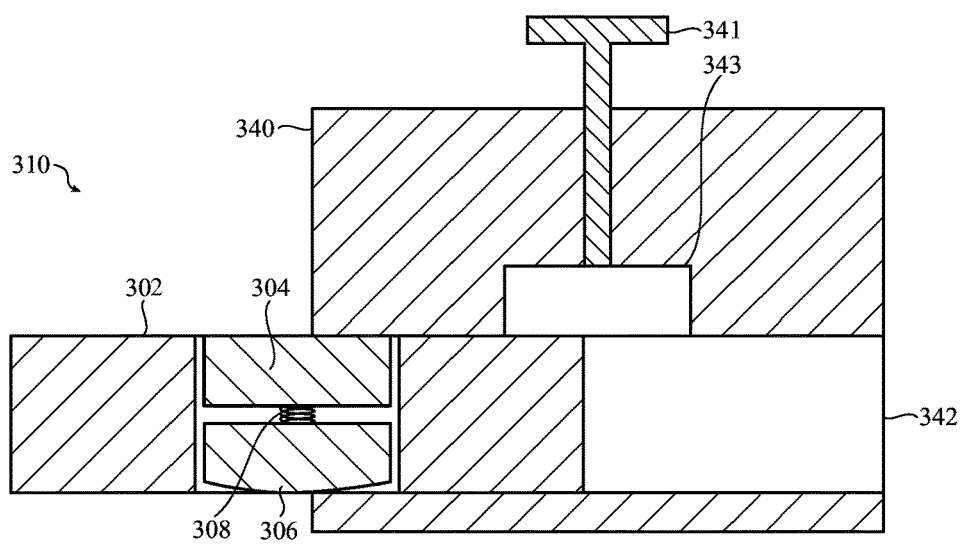
FIG. 3C illustrates a block diagram of an attachment system being inserted into a housing of a consumer product according to one or more embodiments of the present disclosure.

FIGS. 3A-C depict a simplified example of attachment system 310 having a removable module 302 being engaged with a mating feature of a mating component 340. The mating component 340 may be the housing or body of a device or other type of consumer product. In certain embodiments, the attachment system 310 of FIG. 3A may be similar to the attachment system 100 discussed above with respect to FIG. 1A-FIG. 1C as well as the other attachment systems, removable modules and the like disclosed herein.

FIG. 3A illustrates a block diagram of an exemplary removable module 302 according to one or more embodiments of the present disclosure. As shown in FIG. 3A, the removable module 302 may include a locking mechanism having a catch member 304 and a ramp member 306. In some embodiments, the catch member 304 is coupled to the ramp member 306 by a spring element 308. In certain embodiments, the catch member may be spring-biased flush or substantially flush with respect to a top surface of the removable module 302 when the locking mechanism is in an expanded state (as shown in FIG. 3A). In addition, the ramp member 306 of the locking mechanism may be spring-biased proud with respect to a bottom side of the removable module 302.

FIG. 3B illustrates a block diagram of a housing or component 340 of a consumer product according to one or more embodiments of the present disclosure. In certain embodiments, the component 340 may be a housing for an electronic device, such as, for example housing 410 such as shown in the figures herein. The component 340 may include a mating feature such as a channel 342 having two ends and an opening extending between the ends. In some embodiments, the channel 342 may have a single opening at one end of the channel 342. The channel 342 may be configured to receive an attachment system, such as, for example, removable module 302 of FIG. 3A.

As shown in FIG. 3B, the component 340 may also include a release mechanism 341 disposed relative to the channel 342. The release mechanism 341 may positioned within or relative to a recess 343 formed in a side wall of the channel 342. In some embodiments, the actuation of the release mechanism 341 causes the release mechanism 341 to expel the catch member 304 (FIG. 3A) from the recess 343 and disengage the removable module 302 from the component 340.

FIG. 3C illustrates a block diagram of an attachment system 310 having a removable module 302 being inserted into a component or component 340 of a consumer product according to one or more embodiments of the present disclosure. A first end of the removable module 302 may be inserted into an opening of a channel 342 of a component 340. As the removable module 302 is inserted further into the channel 342 of the component 340, the ramp member 306 comes into contact with a lower portion of the channel 342 causing the catch member 304 of the removable module 302 compresses. As shown in FIG. 3C, an upward or inward movement of the ramp member 306 may cause compression of the spring element 308, which produces an upward or outward force on the catch member 304. If the movement of the catch member 304 were to be unimpeded, the upward or outward force would cause the catch member 304 to extend or protrude from the upper surface of the removable module 302. However, as shown in FIG. 3C, because the catch member 304 is at least partially inserted into the channel 342, the catch member 304 is prevented from protruding and remains substantially flush with the upper surface of the removable module 302. Thus, with reference to FIG. 3C, as the removable module 302 continues to slide or move within the channel 342 of the component 340, the locking mechanism remains in the compressed state (e.g., both the catch member 304 and the ramp member 306 being contained within the body of the removable module 302). The locking mechanism remains in this state until the catch member 304 is in proximity to the recess 343 or other opening within the channel 342.

Figure 3D:
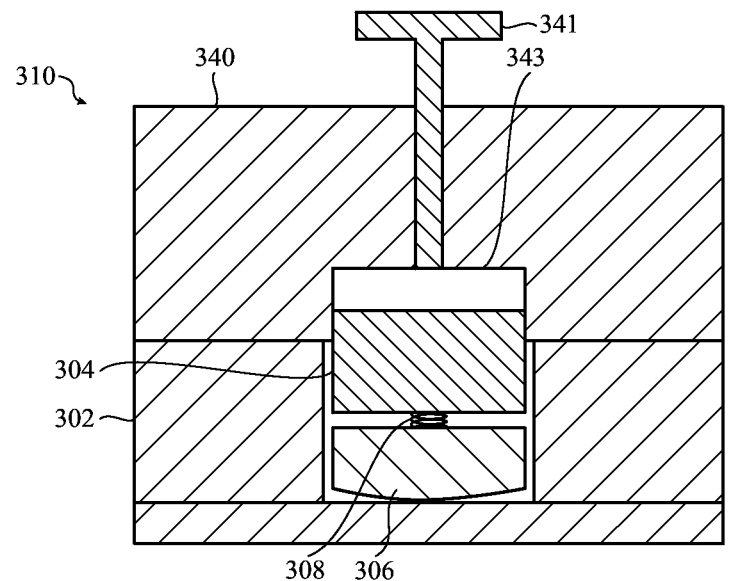
FIG. 3D illustrates the attachment system being locked in place within the housing of the consumer product according to one or more embodiments of the present disclosure.

FIG. 3D illustrates the removable module 302 fully engaged or inserted into the mating feature of the component 340, in this case, the channel 342. As shown in FIG. 3D, the removable module 302 is positioned such that the catch member 304 is aligned with or proximate to the recess 343. As also shown in the example of FIG. 3D, the removable module 302 is centered with respect to the channel 342 and the sides of the removable module 302 are flush or substantially flush with respect to one or more sidewalls of the component 340.

As shown in FIG. 3D, the catch member 304 is permitted to expand, be received, or otherwise engaged with the recess 343, which locks the removable module 302 in place within the component 340. In particular, the catch member 304 of the locking mechanism may move from a first position, in which the catch member 304 is flush or substantially flush with respect to a top surface of the removable module 302, to a second position in which the catch member 304 of the locking mechanism protrudes from the top surface of the removable module 302 and is received into the recess 343. The upward or outward movement of the catch member 304 is facilitated by spring element 308, which maintains the catch member 304 in the second position, as shown in FIG. 3D. In the present example, the engagement between the catch member 304 and the recess 343 prevents movement of the removable module 302 with respect to the channel 342.

In an alternative embodiment, the locking mechanism may include a catch member 304 but not a ramp member 306. In such embodiments, the catch member 304 of the locking mechanism may be biased by a spring or similar element causing the catch member 304 to protrude from a top surface of the body of the removable module 302. In some embodiments, when the catch member 304 of the locking mechanism comes into contact with the channel 342 of the component 340, the contact causes the catch member 304 to be withdrawn or depressed into the removable module 302, causing one or more springs or compressible elements of the locking mechanism to compress. However, when the catch member 304 is in proximity to the recess 343 of the channel 342, such as described above with respect to FIG. 3D, the catch member 304 is permitted to expand or otherwise move into the recess 343 thereby locking removable module 302 within the channel.

In some embodiments, a release mechanism 341 may be used to disengage or release the removable module 302. In some cases, in order to unlock the removable module 302, a release mechanism 341 disposed on the component 340 (e.g., housing) of the consumer product is configured to expel the catch member 304 from the recess 343. In some implementations, when the release mechanism 341 is actuated, a plunger of the release mechanism 341 causes the catch member 304 of the locking mechanism to move from the second position back to, or substantially back to, the first position. Once the catch member 304 of the locking mechanism has been removed from the recess 343, the removable module 302 may be moved within, or removed entirely from, the channel 342 of the component 340.

Figure 3E:
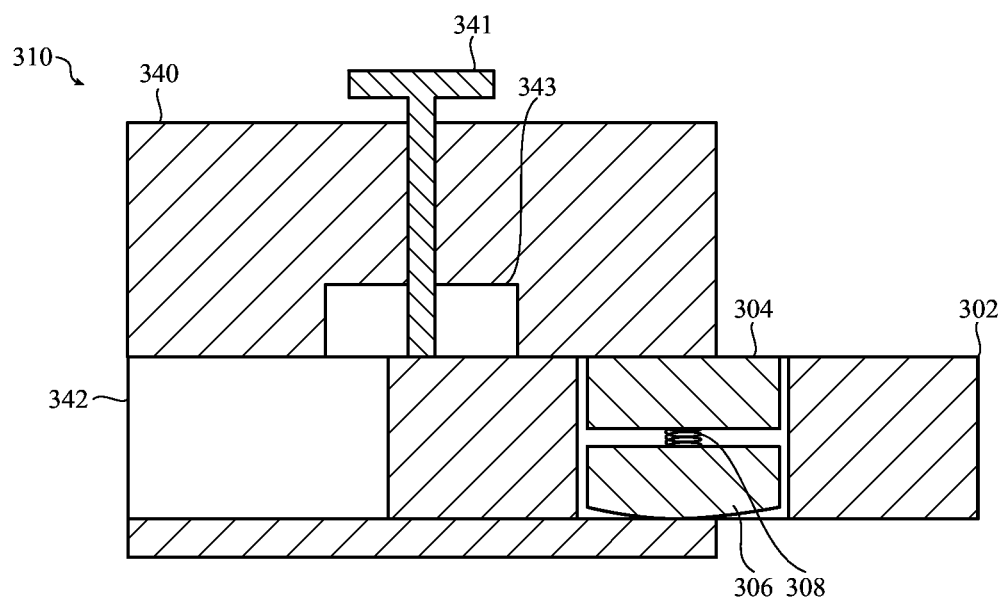
FIG. 3E illustrates the attachment system being removed from the housing of the consumer product according to one or more embodiments of the present disclosure.

FIG. 3E illustrates the removable module 302 being removed from a housing or component 340 of a consumer product according to one or more embodiments of the present disclosure. As described above, once the catch member 304 has be expelled or is otherwise removed from the recess 343, the removable module 302 may slide or move within the channel 342 of the component 340. For example, as shown in FIG. 3E, the removable module 302 may be moved in a direction away from the opening 142 and out of opening 143. In this case, the removable module 302 may be slid out of the channel 342 completely disengaging the removable module 302 from the component 340.

Although actuation of a release mechanism 341 is specifically mentioned, the catch member 304 may be compressed using other methods. However, this alternate design, nor any other alternate design disclosed herein, does not affect the utility of the embodiments disclosed herein. For example, a lateral force may be applied to the removable module 302 when the catch member 304 is within the recess of the channel. As the lateral force is applied to the removable module 302, the catch member 304 of the locking mechanism may contact the side of the recess 343. As the removable module 302 continues to move in the direction of the applied force, the side of the recess 343 may cause the catch member 304 of the locking mechanism to further contract until the catch member 304 has moved from the second position back to, or substantially back to, the first position. Once the catch member 304 of the locking mechanism has been removed from the recess, the removable module 302 may move or slide within the channel 342 and may be disengaged or separated from the component 340.

Figure 4:
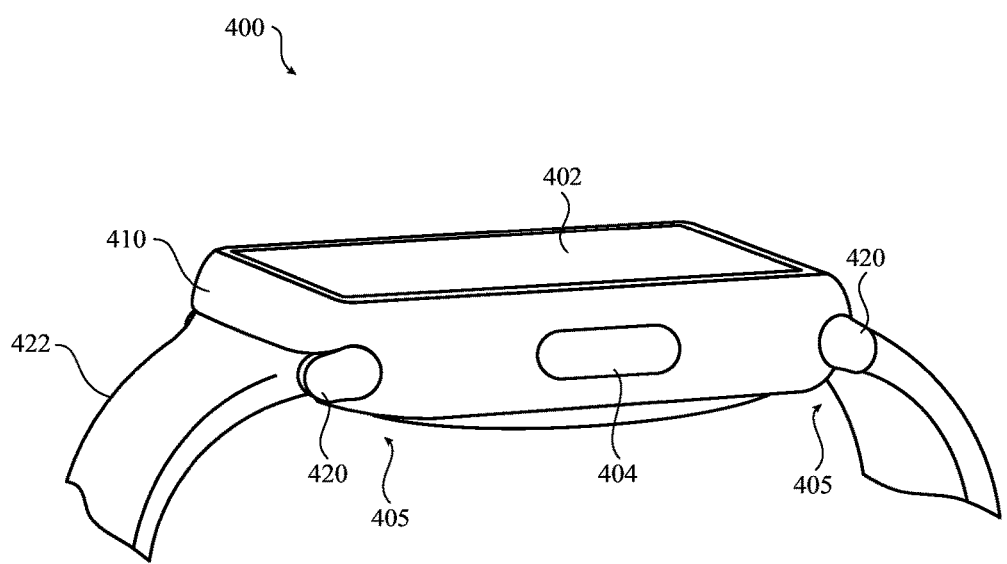
FIG. 4 illustrates an exemplary consumer product configured to removably receive an attachment system according to one or more embodiments of the present disclosure.

FIG. 4 illustrates an exemplary consumer product 400 that may be used with the attachment system of the present disclosure. The consumer product 400 may, for example, correspond to the consumer product discussed with respect to the embodiments of this disclosure. The consumer product 400 may be widely varied. In some embodiments, the consumer product may be a wearable consumer product 400. Additionally or alternatively, the consumer product 400 may be an electronic device. In yet other embodiments, the consumer product 400 may be a portable computing device. Examples include cell phones, smart phones, tablet computers, laptop computers, timekeeping devices, computerized glasses and other wearable devices navigation devices, sports devices, accessory devices, health-monitoring devices, medical devices, wristbands, bracelets, jewelry, and/or the like.

In one example and as shown in FIG. 4, the consumer product 400 may be a wearable multifunctional electronic device. The electronic device may have various functionalities and/or capabilities described above (e.g., computing, communication, timekeeping or time display, health monitoring, health tracking and/or health output functionalities/capabilities, etc.). In one example, the consumer product 400 is a wrist worn multifunctional device and may include various components and/or modules such as, for example, the components and modules shown and described below with respect to FIG. 16. In another example, the consumer product 400 may act as an extension of another electronic device (or vice versa). For example, if the consumer product 400 is configured as a wrist worn device, it may serve as a watch like device that can interact with a phone that is carried by (e.g., in a pocket) or otherwise associated with the user.

The consumer product 400 may include a housing 410. The housing 410 serves to surround a peripheral region of the consumer product 400 as well as support the internal components of the consumer product 400 in their assembled position. That is, the housing 410 may enclose and support various internal components (including for example integrated circuit chips, processors, memory devices and other circuitry) to provide computing and functional operations for the consumer product 400. The housing 410 may also help define the shape or form of the consumer product 400. That is, the contour of the housing 410 may embody the outward physical appearance of the consumer product 400. As such, it may include various ornamental and mechanical features that improve the aesthetical appearance and tactile feel of the device.

In embodiments, the housing 410, which may sometimes be referred to as a case or enclosure, may be formed of plastic, glass, ceramics, fiber composites, metal (e.g., stainless steel, aluminum, titanium, magnesium), other suitable materials, or a combination of these materials. Further, the surface of the housing 410 may be formed from any suitable material, including aluminum, steel, gold, silver and other metals, metal alloys, ceramics, wood, plastics, various types of glass and combinations thereof, and the like.

The consumer product 400 may include one or more I/O systems. For example, the consumer product 400 may include a display 402 configured to output various information about the consumer product 400. The display 402 may also output data from applications and other programs that are being executed by the consumer product. For example, the consumer product 400 may provide information regarding time, health of a user, status notifications, notifications or messages received from externally connected devices or communicating devices and/or software executing on such devices. The consumer product 400 may also provide information about applications or otherwise display messages, video, operating commands, and so forth that are executing on the consumer product.

The display 402 may also be configured to receive input. The display 402 may be integrated with or incorporated with a touch panel or touch sensor that includes an array of capacitive touch electrodes. In embodiments where the display 402 is configured to receive input, the display 402 may have an input area. The input area may cover the entire display 402 or substantially all of the display 402. In another embodiment, the input area may cover only a portion of the display 402. Further, the display 402 may be a multi-touch display that is configured to receive and process various contact points received on the display.

The display 402 may include image pixels formed from light-emitting diodes (LEDs), organic LEDs (OLEDs), plasma cells, electronic ink elements, liquid crystal display (LCD) components, or other suitable image pixel structures. The shape, size and dimensions of the display 402 may also vary. For example, the display 402 may be planar or substantially planar. In other embodiments, the display 402 may be concave or convex. The display 402 may be shaped to cover or substantially cover a top portion of the housing 410. As such, the display may have a shape that is similar to the shape of the housing 410. In other embodiments, the shape of the display may differ from the shape and/or size of the housing 410.

The consumer product 400 may also include other input and output mechanisms. For example, the consumer product may include or interface with one or more buttons 404, keys, dials, trackpads, microphones and the like. The consumer product may also include one or more speakers, headphone jacks and the like.

In embodiments, the consumer product 400 may also be configured to provide haptic output, audio output, visual output or combinations thereof. With respect to the haptic output, the consumer product 400 may have one or more haptic actuators that are configured to provide the haptic output. The haptic output, and other forms of output provided above, may vary based on a variety of factors. Some of these include, but are not limited to, how the consumer product 400 is being used, which applications are being executed, the information that is output on the display 402 and the like. For example, if the consumer product 400 is monitoring the health of the user, a first type of haptic output may be provided. Alternatively or additionally, if the consumer product 400 is being used as a time keeping application, a second type of haptic output may be provided. In yet another example, if a warning or message is output on the display 402, the warning or message may include a haptic output, visual output and an auditory output.

The type, feel and duration of the haptic output, the audio output and/or the visual output may also vary. For example, the type, feel and duration of the haptic output of the consumer product 400 based on an orientation of the consumer product 400 and/or a location or position of the consumer product 400 (e.g., with respect to a user, environmental conditions, whether the consumer product is outside or inside and the like).

In addition to the above, the band or other accessory attached to the device (using, e.g., the attachment system), may be configured to provide and/or enhance haptic feedback. For example, the band or other accessory may have a haptic actuator disposed in an inner portion of the removable portion. In another embodiment, the band or accessory that is coupled to the attachment system may be used to enhance and/or provide haptic output. In yet another embodiment, a haptic actuator disposed in the consumer product may cause the band or accessory to resonate or amplify the haptic output that is provided by the haptic actuator.

The consumer product 400 may include a connection system, either wired or wireless, that enables the consumer product to interface with other devices. These other devices may include laptop computers, mobile phones, tablet computers, exercise equipment, electronic glasses and the like.

The consumer product 400 may also include operation components (potentially housed with the housing 410). These components may include a processor, a memory, a communication system, an antenna and the like. For example, the consumer product 400 may include a processor coupled with or in communication with a memory. The consumer product 400 may also include one or more communication interfaces, The communication interface(s) can provide electronic communications between the communications device and any external communication network, device or platform, such as but not limited to wireless interfaces, Bluecatch member interfaces, Near Field Communication interfaces, infrared interfaces, USB interfaces, Wi-Fi interfaces, TCP/IP interfaces, network communications interfaces, or any conventional communication interfaces.

The consumer product 400 may also include various sensors. These sensors may include and are not limited to, biometric sensors, gyroscopes, accelerometers, light sensors, optical sensors, global positioning sensors, and so on. These sensors may assist with or otherwise provide functionality to the consumer product 400. In addition, readings from these sensors may be analyzed by the consumer product 400 and/or may be transmitted to a companion device or other product.

As also shown, in FIG. 4, the consumer product 400 may include an attachment system 405 located at either end of the housing 410. As discussed with respect to the previous examples and described in more detail below with respect to FIGS. 5A-C and FIGS. 6A-C, the housing 410 main include a feature such as a channel or opening that is configured to receive a removable module, such as an interchangeable lug, for a wristband or attachment accessory 422. While a wristband is depicted as an example attachment accessory 422, other types of attachment accessories, accessories, components, and the like, may be removably attached to the housing 410 of the device 400 using the attachment system 405.

In some embodiments, each accessory 422 attached to either end of the housing 410 may be configured to be coupled to each other. For example, a first accessory 422 may be coupled or otherwise attached to a second accessory 422 such that the accessories form a loop. This loop may then be used to attach the consumer product 400 to a user's wrist or other part of the user's body.

In some embodiments, the accessory may be a unitary accessory. In such embodiments, a proximate end of an accessory may be attached to the housing 410 using an attachment system 405 and another, distal end of the accessory may be configured to couple to another component or device. In some cases, the distal end of a first accessory may be configured to couple with another, second accessory that is attached to the other end of the housing using another attachment system. In some cases, the second accessory is a loop or clasp that is configured to receive the distal end of the first accessory. In particular, in some implementations, the first accessory includes a long band strap that is configured to attach the device to the user by looping the band strap through the second accessory, which includes a loop or clasp.

In some embodiments, the accessory 422 includes a removable module 420 that forms the non-device portion of the attachment system 405. In the case of a watch band accessory 422, the removable module 420 may include a lug having one end that is configured to attach to the housing 410 of the product 400 and another end that is configured to attach to a band strap of the accessory 422. In some embodiments, a component of the accessory 422 (e.g., a band or strap) may be coupled to the removable module 420 using a clasp or other attachment means such as, for example, magnets, snaps, and the like. In some embodiments, a component of the accessory 422 (e.g., a band or strap) may be secured, coupled or otherwise attached to the removable module 420 using a variety of attachment means. Examples of such include, but are not limited to a clasp, a pin, magnets, snaps, and other such attachment means. In other embodiments, one or more components of the accessory 422 may be secured to the removable module 420 by overmolding a material, weaving a material into, or otherwise integrating the material of the component with the removable module 420.

FIG. 5A-FIG. 6C illustrate an exemplary attachment system 405 including a removable module 420 and housing 410 combination in accordance with an embodiment of the present disclosure. The removable module 420 may for example, correspond to the attachment system shown and described with respect to any of the previous figures. Likewise, the housing 410 may correspond to the various housings shown and described above. For example, the removable module 420 and the housing 410 of the attachment system 405 may be similar to the attachment system and housing shown and described with respect to FIG. 4.

Figure 5A:
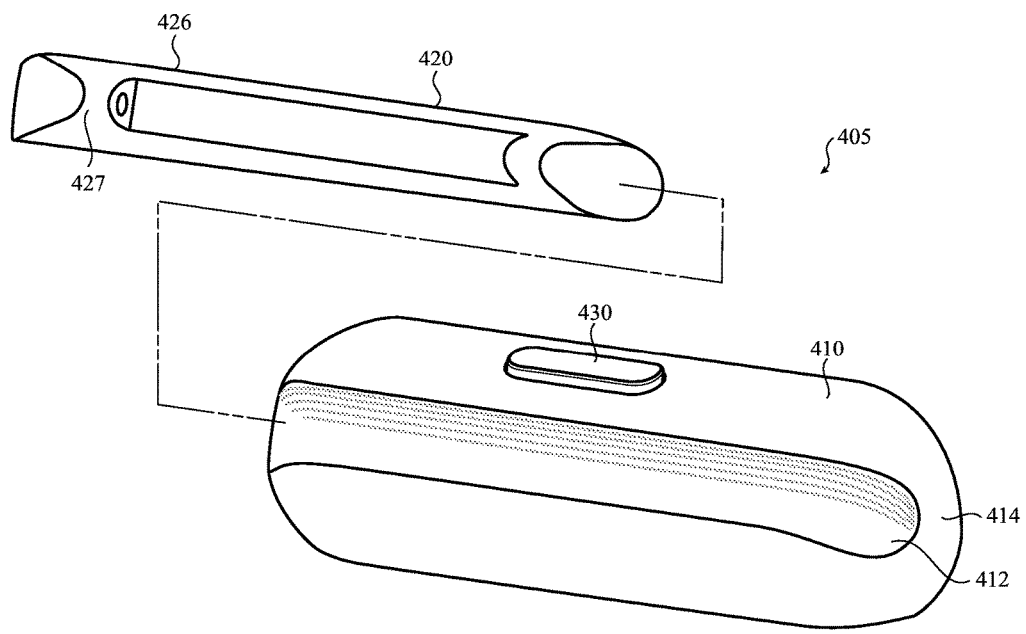
FIG. 5A-FIG. 5C illustrate perspective views of an exemplary attachment system being coupled with a consumer product according to one or more embodiments of the present disclosure.
Figure 5B:
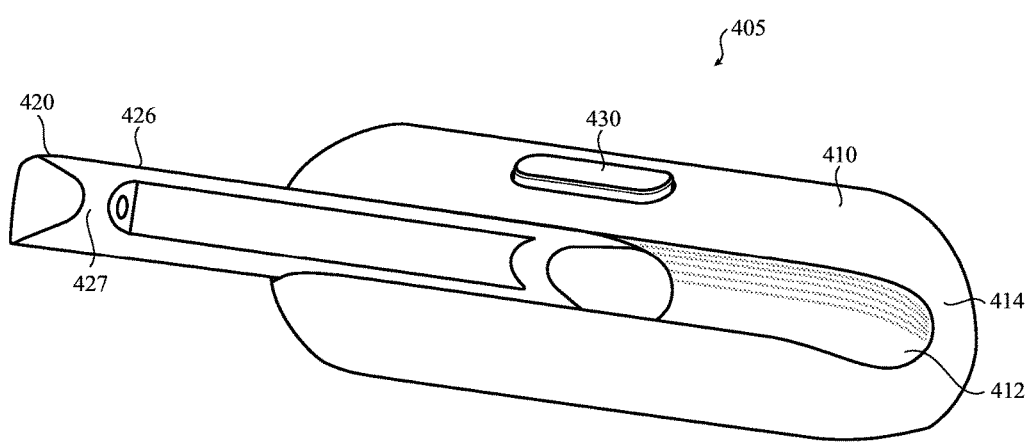
Figure 5C:
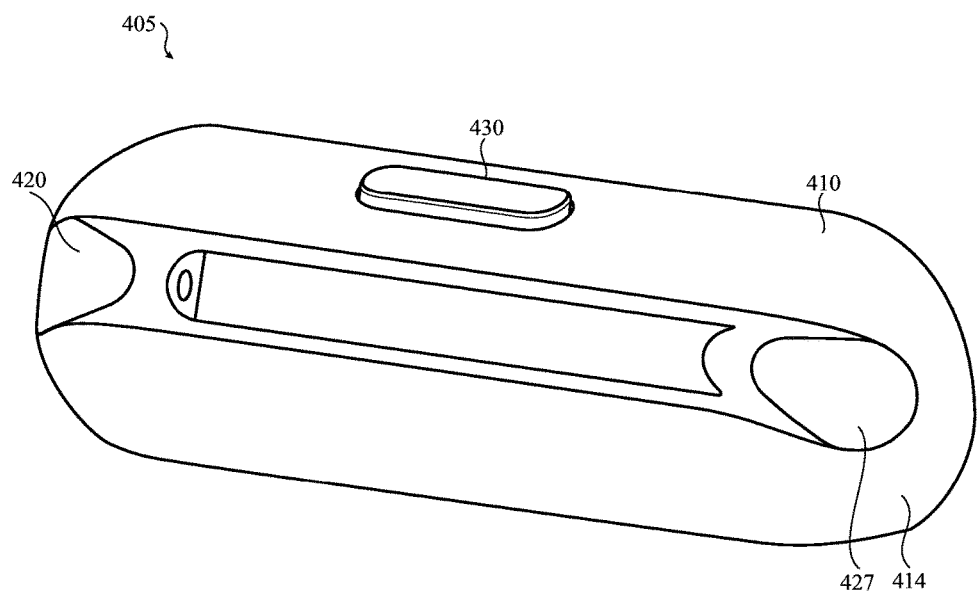

As shown in FIG. 5A-FIG. 5C, the removable module 420 may be removably coupled to a component or housing 410 of a consumer product. More specifically, FIG. 5A-FIG. 6C illustrate the attachment system 405 during various stages of insertion into a component or housing 410 of a consumer product.

FIG. 5A illustrates an exemplary attachment system 405 including a removable module 420 and an exemplary housing 410 or component of a consumer product according to embodiments of the present disclosure. As will be described below, the removable module 420 is configured as an entirely separate unit that may be wholly removed from or integrated with the housing 410 of the consumer product. The removable module 420 may have a rounded and/or tapered body 426 with one or more arms 427 extending from the body 426. The outer walls of the arms 427 may be smooth and chamfered such as shown. The shape of the arms 427 may vary based on the shape of the channel 412 and the shape of the housing 410. Further, the arms 427 are configured to be flush or substantially flush with respect to at least a portion of an outer surface 414 of the housing 410 when the removable module 420 has been placed entirely within the housing 410 such as shown in FIG. 5C.

As also shown in FIG. 5A, the housing 410 may include a release mechanism 430 that is configured to interact with one or more components of the attachment system 405. For example, the release mechanism 430 is configured to be actuated to release the removable module 420 from the channel 412 of the housing 410 after the removable module 420 has been locked in place within the housing 410. A more detailed description of an example button is provided below with respect to FIGS. 11A-B.

FIG. 5B illustrates the removable module 420 being partially inserted into the channel 412 of the housing 410. As shown in FIG. 5B, the removable module 420 fits within the channel 412 and is moveable back and forth within the channel 412. Although not shown in FIG. 5B, once the body 426 of the removable module 420 has been inserted into the channel 412, a locking mechanism of the attachment system is compressed such as shown and described with reference to FIGS. 12A-C.

Once the body 426 of the removable module 420 is fully inserted into the channel 412 such as shown in FIG. 5C, the locking mechanism, or a portion of the locking mechanism, engages with a recess in the channel, which locks the attachment mechanism in place within the channel 412. Interaction between the locking mechanism and the recess is shown and described in greater detail below with respect to FIGS. 12A-C and 13A-B. When the removable module 420 has been locked within the channel 412, actuation of the release mechanism 430 on an outer surface 414 of the housing 410 releases the attachment system thereby permitting the removable module 420 to move within the channel 412.

Figure 6A:
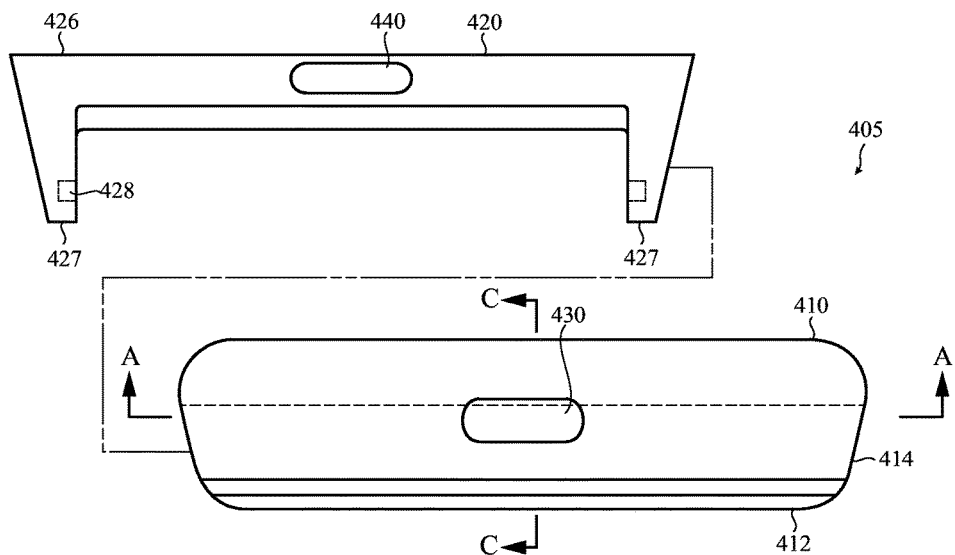
FIG. 6A-FIG. 6C illustrate top views of an exemplary attachment system being coupled with a consumer product according to one or more embodiments of the present disclosure.
Figure 6B:
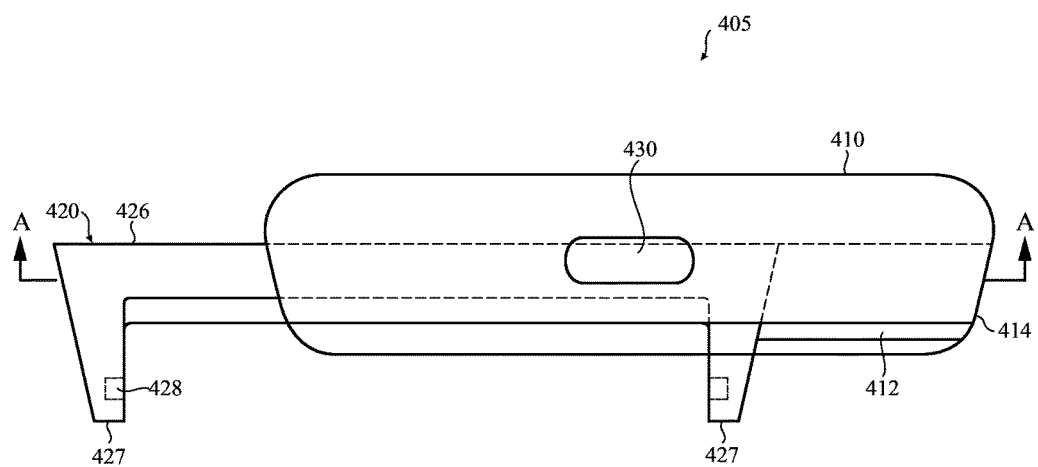
Figure 6C:
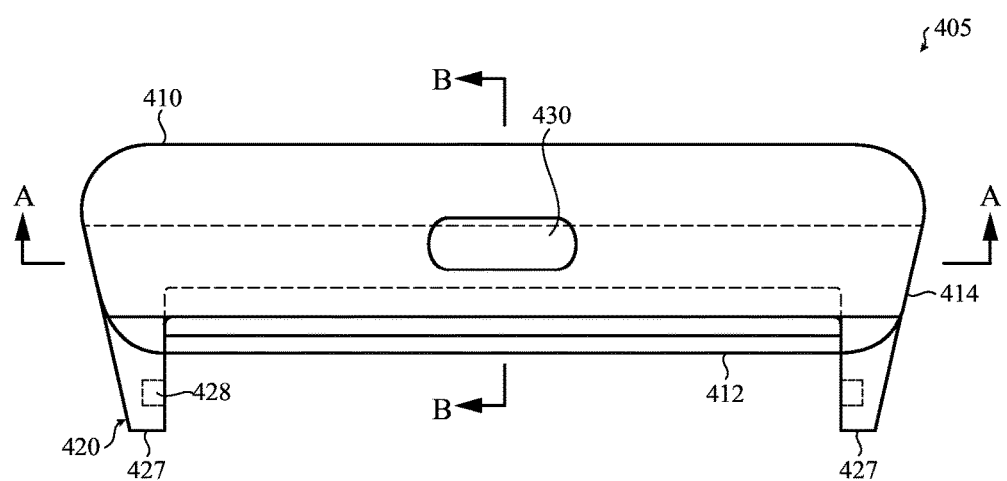

FIG. 6A-FIG. 6C illustrate various plan views of an attachment system 405 including a removable module 420 and an exemplary housing 410 or component of a consumer product according to embodiments of the present disclosure. In embodiments, the removable module 420 may be similar to the attachment systems shown and described above. As such, the removable module 420 may be inserted into a housing 410 of an electronic device or otherwise coupled to a consumer product. Further, the removable module 420 may be removably connected to a band, a strap, a dock, a stand, a display system and the like.

The various components and features of the removable module 420 will be discussed in greater detail below with respect to FIGS. 7A-FIG. 13B. As such, similar reference numbers may be used across the various figures to show similar components. Additionally, various cross-sectional views represented by cross-section AA and cross-section BB are discussed in greater detail below. Additionally, various cross-sectional views represented by cross-section CC and cross-section DD shown in FIG. 6A are discussed in greater detail below.

FIG. 6A illustrates a top view of the removable module 420 not engaged or attached to the housing 410, FIG. 6B illustrates a top view of the removable module 420 being partially inserted into the channel 412 of the housing 410, and FIG. 6C illustrates a top view of the attachment system being fully inserted into the channel 412 of the housing 410. As shown in the assembly sequence of FIGS. 6A-C, the removable module 420 is configured to slidably engage with the channel 412 of the housing 410 to connect the two components. Other components, such as a band or strap, may also be attached to the removable module 420, which are omitted from these views for clarity.

As shown in FIGS. 6A-C a catch member of a locking mechanism 440 disposed on the body 426 may also interact with the channel 412. As will be shown and described below with respect to FIGS. 12A-C, the catch member of the locking mechanism 440 may be spring-biased flush with respect to the body 426 of the attachment system 405. As a result, the catch member may be received into the channel 412 with little resistance. However, when the body 426 of the attachment mechanism has been fully received into the channel 412, the catch member may expand into a recess within the channel 412 such as shown and described below with respect to FIGS. 12A-C and 13A-B.

As shown in FIGS. 6A-C, the removable module 420 may have a profile shape that corresponds to at least a portion of the profile shape of the housing 410. In particular, as shown in FIG. 6C, the width of the channel 412 may be substantially equivalent to the width the body 426. In some embodiments, when the removable module 420 is fully inserted, as shown in FIG. 6C, at least a portion of the outer surface of the body 426 is flush or substantially flush with an outer surface 414 of the housing 410. In the present embodiment, the contour of the outer surface of the body 426 corresponds to the contour of the outer surface 414 of the housing. Also, as also shown, the arms 427 of the removable module 420 may extend from the housing 410 in a direction perpendicular to the length of the channel 412.

As shown in FIGS. 6A-C, the removable module 420 includes arms 427 for coupling the removable module 420 with another component of the accessory. In the present embodiment, an engagement feature 428 is formed in a surface of a respective arm 427. As shown in FIGS. 6A-C, the engagement feature 428 may include a recess that is configured to receive a pin, post, or similar protrusion feature of a mating part. In some embodiments, the mating part includes a band strap or other component that is configured to be attached to the removable module 420 using the engagement feature 428.

Figure 7A:
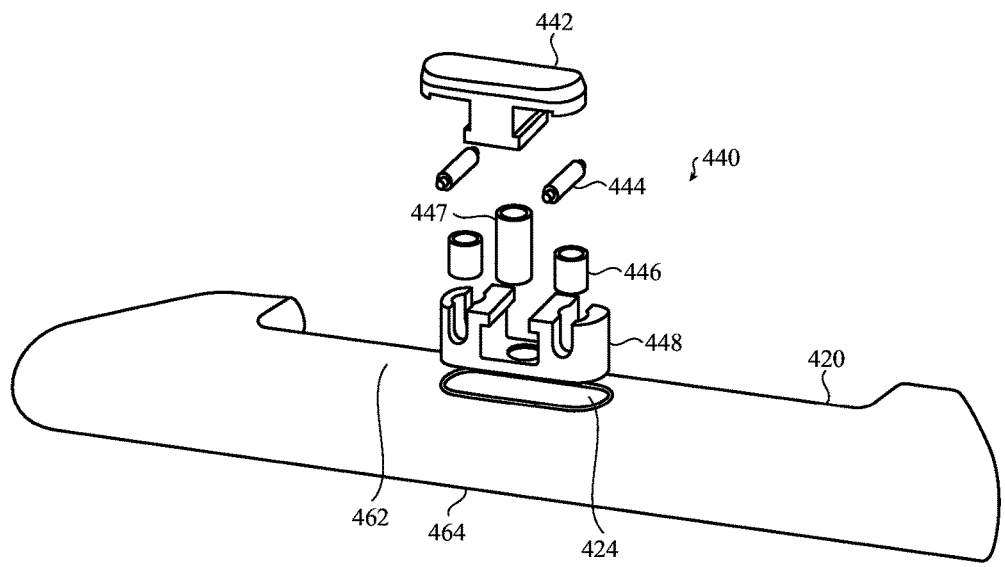
FIG. 7A illustrates a perspective exploded view of a locking mechanism according to one or more embodiments of the present disclosure.
Figure 7B:
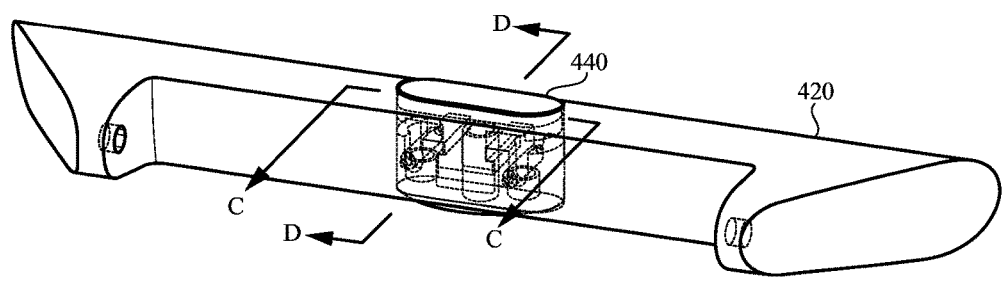
FIG. 7B illustrates a perspective view of the assembled locking mechanism of FIG. 7A according to one or more embodiments of the present disclosure.

FIGS. 7A-B depict an example removable module 420 having a locking mechanism 440. In particular FIG. 7A illustrates a perspective exploded view of a locking mechanism 440 and FIG. 7B illustrates a perspective (non-exploded) view of the assembled locking mechanism 440 of FIG. 7A. The locking mechanism 440 of FIGS. 7A-B may correspond to the locking mechanism referenced in embodiments described above with respect to previous figures. While the terms "upper," "upward," "lower," and "downward" are used with respect to surfaces and positions of elements in the following embodiments, the terms are relative in nature and are not intended to require an absolute orientation or position.

In general, the removable module 420 of FIGS. 7A-B is configured to slidably engage with a mating feature of an consumer product or component of a consumer product. The consumer product may include, for example, an electronic device, wearable electronic device, wearable device, and the like. In some embodiments, the mating feature of the consumer product forms a channel or opening for receiving the removable module 420, as described above with respect to FIGS. 5A-C.

The locking mechanism 440 of FIGS. 7A-B may be configured to engage with a recess, pocket, or aperture formed into or through the mating feature of the consumer product. When engaged with the recess, pocket, or aperture of the consumer product, the locking mechanism 440 may retain the removable module 420 within the mating feature. As discussed in more detail below with respect to FIGS. 13A-B, the locking mechanism 440 may also be configured to be disengaged using a release mechanism integrated with or installed in the consumer product.

As shown in FIG. 7A, the locking mechanism 440 is a spring-loaded mechanism that is configured to protrude or extend a catch member 442 with respect to an upper surface 462 of the removable module 420. In the present example, the locking mechanism 440 is configured to be installed or disposed with respect to aperture 424 formed in the body of the removable module 420. The locking mechanism 440 includes a catch member 442 that is disposed or positioned within the aperture 424 and oriented toward the upper surface 462 of the removable module 420. The locking mechanism 440 also includes a ramp member 448 that is disposed or positioned within the aperture 242 and is oriented toward a lower surface 464 of the removable module 420.

In the embodiment depicted in FIG. 7A, two spring bars 444 are positioned within the aperture 242 spanning across the width of the aperture 424. As shown in FIGS. 7A-B, the spring bars 444 are generally positioned between the catch member 442 and the ramp member 448. In the present example, the spring bars 444 are arranged substantially perpendicular to the long axis or length of the removable module 420. In other embodiments, the spring bars 444 may be positioned in a different orientation with respect to the length of the removable module 420.

As shown in FIGS. 7A-B, a first spring 446 is positioned or coupled between each spring bar 444 and the ramp member 448. The first spring 446 generally biases the ramp member 448 away from the respective spring bar 444 and also in the direction of the lower surface 464. In the present embodiment, the first spring 446 may include a coil-type compression spring formed form a material such as steel, spring steel, stainless steel, music wire, plastic, bronze, and the like. Other types of springs may also be used including, for example, elastomeric members, foam members, spring clips, torsion springs, or any other component configured to provide a biasing force.

As shown in FIGS. 7A-B, a second spring 447 is positioned or coupled between the ramp member 448 and the catch member 442. The second spring 447 generally biases the catch member 442 away from the ramp member 448 and also in the direction of the upper surface 462. In the present embodiment, only a single second spring 447 is used. However, in other embodiments, more than one spring may be used to bias the catch member 442 and the ramp member 448 away from each other. In the present embodiment, the first spring 447 may also include a coil-type compression spring formed form a material such as steel, spring steel, stainless steel, music wire, plastic, bronze, and the like. Other types of springs may also be used including, for example, elastomeric members, foam members, spring clips, torsion springs, or any other component configured to provide a biasing force.

In the present example, the spring bars 444 are configured to facilitate the installation of the locking mechanism 440 within the aperture 424 of the removable module 420. In particular, the spring bars 444 are configured to be at least partially collapsible such that the spring bars 444 may be inserted into the aperture 424 in a partially collapsed or compressed state. Once inserted, the spring bars 444 may expand or extend into respective mating features formed into the sidewall of the aperture 424. As described in more detail below with respect to FIGS. 10A-B, the mating features may include one or more recesses or pockets formed into the wall of the aperture 424. In the present example, two spring bars 444 are used to retain or capture the locking mechanism 440. However, in other embodiments, a single spring bar may be used or more than two spring bars may be used to retain or capture the locking mechanism 440 within the removable module 420.

The spring bars 444 may include a spring-loaded mechanism that is configured to partially collapse when loaded and return to an extended position when unloaded. In some embodiments, the spring bar 444 includes a barrel portion and two spring-loaded protrusions that extend out from each end of the barrel portion. The spring-loaded protrusions may be configured to engage a recess feature formed into the wall of the aperture 424. In some embodiments, the spring bar 444 includes only a single spring-loaded protrusion that extends out from one end of the barrel portion. In the present embodiment, the spring bars 444 are generally formed as a straight cylindrical shape. However, in other embodiments, the spring bars 444 may be formed from a curved cylindrical shape, bent cylindrical shape, or be formed from a variety of other types of shapes.

Figure 8A:
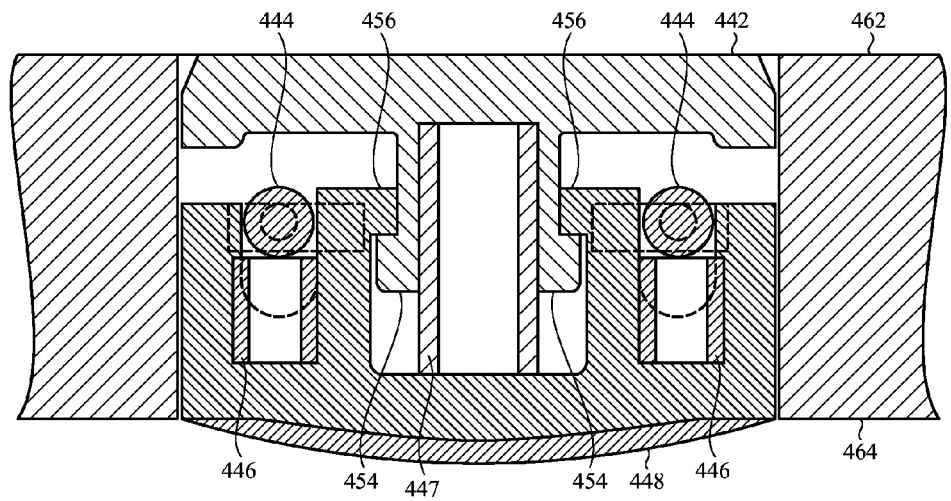
FIG. 8A illustrates a cross-sectional view of the locking mechanism of FIG. 7B taken along section C-C according to one or more embodiments of the present disclosure.
Figure 8B:
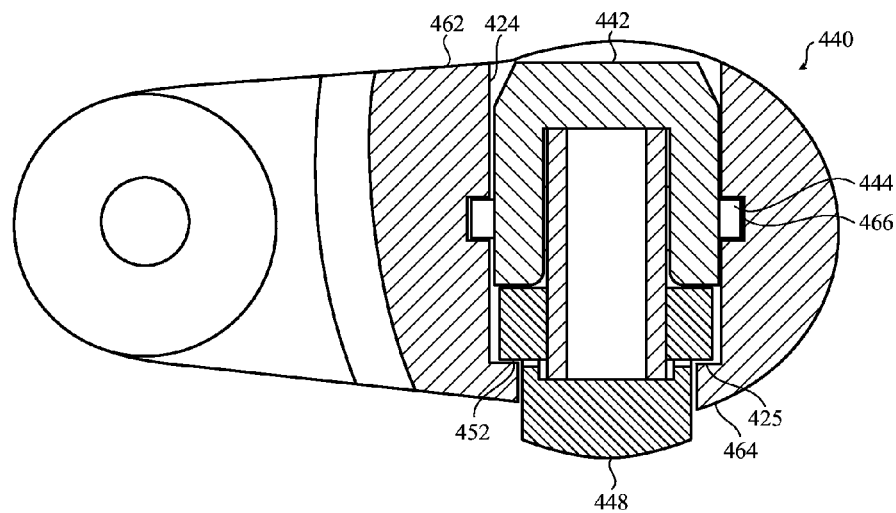
FIG. 8B illustrates a cross-sectional view of the locking mechanism of FIG. 7B taken along section D-D according to one or more embodiments of the present disclosure.

FIGS. 8A-B depict cross-sectional views of the locking mechanism 440 of FIGS. 7A-B. The configurations depicted in FIGS. 8A-B are illustrative in nature and the specific geometry or location of the various feature may vary without departing from the concepts described herein. In particular, FIGS. 8A-B depict an example mechanism that uses spring bars 444 to capture or secure the locking mechanism 440 within the aperture 424 and features that provide an engagement between the catch member 442 and the ramp member 448.

FIG. 8A illustrates a cross-sectional view of the locking mechanism of FIG. 7A taken along section 8A-8A. As shown in FIG. 8A, the first springs 446 are coupled between the respective spring bars 444 and the ramp member 448. As discussed above, the first springs 446 bias the ramp member 448 away from the spring bars 444. In the present example, the ramp member 448 protrudes from the lower surface 464 due to the biasing force provided by the first springs 446.

As shown in FIG. 8A, the second spring 447 biases the catch member 442 away from the ramp member 448. In the present example, the catch member 442 remains substantially flush with the upper surface 462 due to the biasing force provided by the second spring 447. Additionally, the catch member 442 is mechanically engaged to the ramp member 448 to limit the upward or outward movement of the catch member 442. In the present example, a catch-retaining feature 454 mechanically engages with a ramp-retaining feature 456 to prevent the upward or outward movement of the catch member 442. In particular, the catch-retaining feature 454 includes a protrusion that is configured to engage with a mating protrusion formed by the ramp-retaining feature 456. While FIG. 8A depicts the retaining features 454, 456 as being integrally formed elements of the respective parts, in alternative embodiments, the retaining features 454, 456 may be formed from separate components that are attached to the respective members.

As shown in FIG. 8B, the locking mechanism 440 is retained or captured within the aperture 424 by the spring bars 444. In particular, the spring bars 444 are configured to engage a recess 466 formed in the wall of the aperture 424. In some embodiments, the recess 466 is formed in a middle or central portion of the aperture 424 to hold the spring bars 444 across the width of the middle or central portion of the aperture 424. In the present example, the spring bars 444 are used to couple to a pair of first springs 446 that exert a downward or outward biasing force on the ramp member 448 toward the lower surface 464. Thus, the spring bars 444 limit the upward or inward movement of the ramp member 448.

As shown in FIG. 8B, the ramp member 448 is retained within the aperture 424 by retaining feature 425. In the present embodiment, the retaining feature 425 is a shoulder or shelf projecting from the wall of the aperture 424. In some embodiments, the retaining feature may be formed from a protrusion, boss, or other type of feature that extends inward from the wall of the aperture 424. In some embodiments, the retaining feature 425 is formed from a separate part that is installed or attached to the removable module 420. For example, the retaining feature 425 may be formed by a collar or snap ring that is fastened or attached to the removable module 420.

In some embodiments, the spring bars 444 may also partially guide one or more components of the locking mechanism 440. For example, as shown in FIG. 8A, the spring bars 444 may slidably engage with a corresponding slot or opening formed in the ramp member 448. In the present example, the spring bars 444 may slidably engage with the walls of the slot or openings to guide the ramp member 448 as it moves up and down within the aperture 424. In some embodiments, the catch member 442 may also include a slot or opening for slidably engaging one or both of the spring bars 444.

Figure 9A:
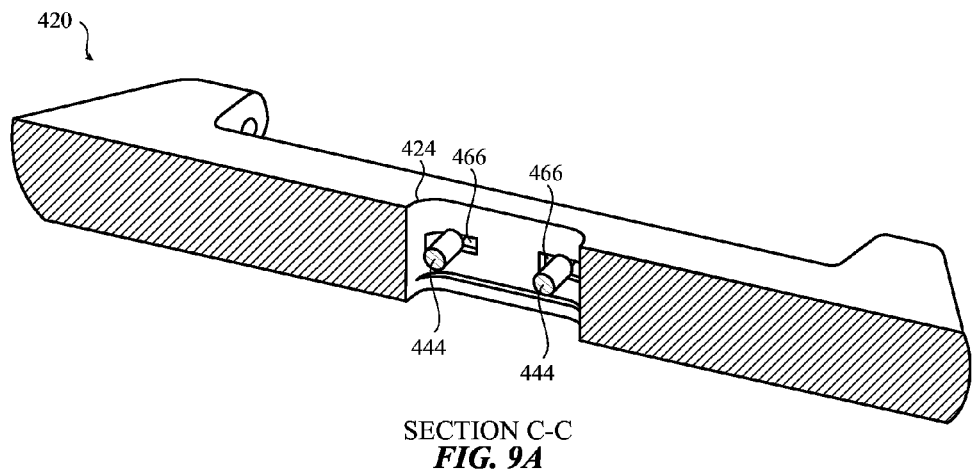
FIGS. 9A-B illustrates cross-sectional views of a removable module and spring bars taken along section C-C according to one or more embodiments of the present disclosure.
Figure 9B:
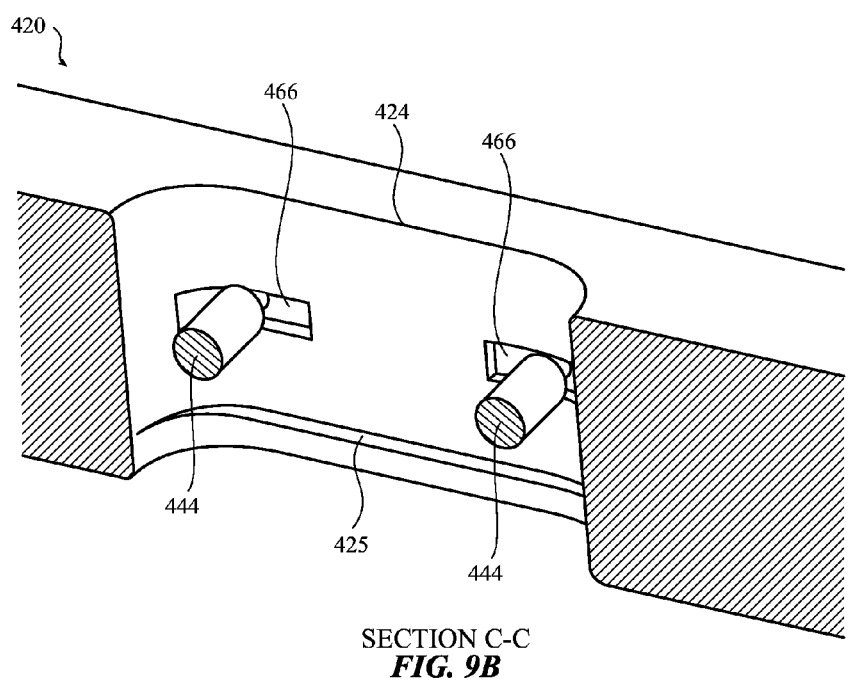

FIGS. 9A-B illustrates cross-sectional views of the body of a removable module 420 and spring bars 444. As previously discussed, the spring bars 444 may be configured to be installed within the aperture 424 formed in the body of the removable module 420. As shown in FIGS. 9A-B, each spring bar 444 engages a respective recess 466 formed in the wall of the aperture 424. In some embodiments, the recess 466 includes an undercut or shelf that prevents the upward (or downward) movement of the spring bar 444 along the length of the aperture 424. As shown in FIGS. 9A-B, the recess 466 may be elongated laterally with respect to the axis of the aperture 424, which may facilitate installation of the spring bars 444 and the locking mechanism. In particular, the elongated recess 466 may allow for some variation in the tolerance in the placement of the spring bars 444 within the locking mechanism in a direction that is lateral to the axis of the aperture 242. In some embodiments, the recesses 466 may also include an edge break or lead-in feature that facilitates installation of the spring bars 444.

As also shown in FIGS. 9A-B, a retaining feature 425 is formed within a lower portion of the aperture 424. A cross-sectional view of the retaining feature 425 is also depicted in FIG. 8B, discussed above. In the present example, the retaining feature 425 includes a shelf that protrudes inward toward the center of the aperture 424. As shown in FIGS. 9A-B, the retaining feature 425 may be formed along one edge of the aperture 424. In other embodiments, the retaining feature 425 may not extend fully along the edge of the aperture 424. In other embodiments, the retaining feature 425 may extend all the way around the perimeter of the aperture 424.

The locking mechanism 440 described above with respect to FIGS. 7A-9B may be installed or assembled into the removable module 420 by positioning the components of the locking mechanism 440 relative to each other, compressing the spring bars 444, and inserting the locking mechanism 440 into the aperture 424 of the removable module 420. For example, the spring bars 444 may be positioned with respect to the ramp member 448 by placing the two components into a fixture or a tooling jig. The first spring 446 may also be disposed between the ramp member 448 and each of the spring bars 444. As part of the installation or assembly, the catch member 442 may be positioned with respect to the ramp member 448. In some implementation, the respective engagement features 454, 456 of the catch member 442 and the ramp member 448, respectively, are engaged or interlocked with each other. The second spring 447 may be disposed between the catch member 442 and the ramp member 448. To install or assemble the locking mechanism 440, both spring bars 444 may be compressed using a clamp or other installation tool. While the spring bars 444 are compressed, the locking mechanism 440, including the ramp member 448, catch member 442, and the spring bars 444, may be inserted into the aperture 424 formed within the removable module. When fully inserted, each of the spring bars 444 may engage with a respective recess 466 formed in a wall of the aperture 424.

Figure 10A:
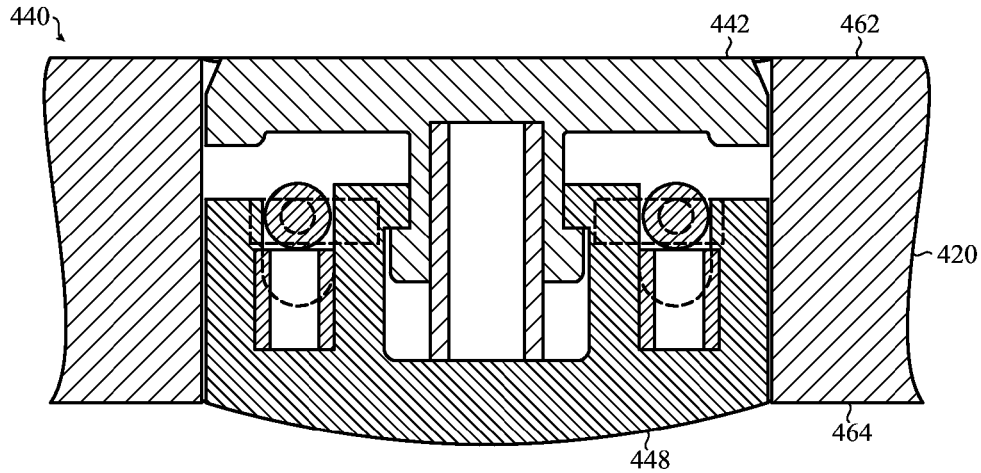
FIGS. 10A-C illustrate a front cross-section view of a locking mechanism as it being engaged with a mating feature of a consumer product taken along section C-C according to one or more embodiments of the present disclosure.
Figure 10B:
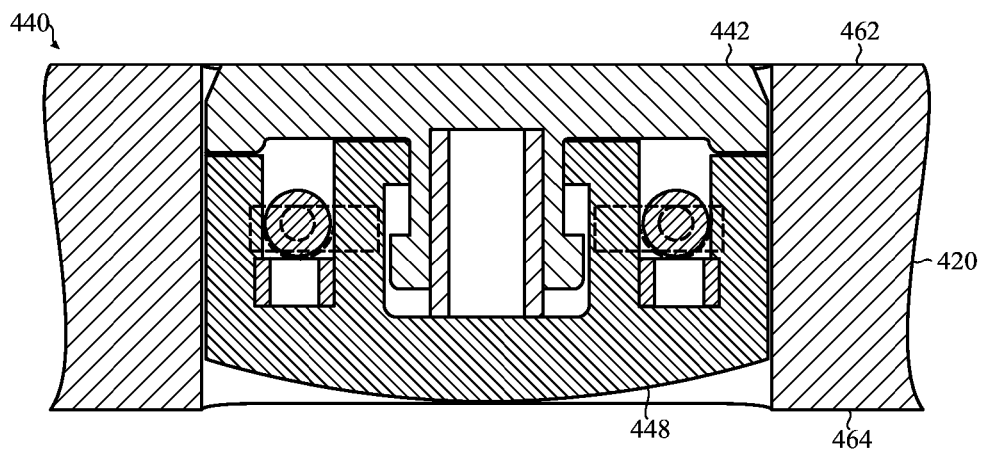
Figure 10C:
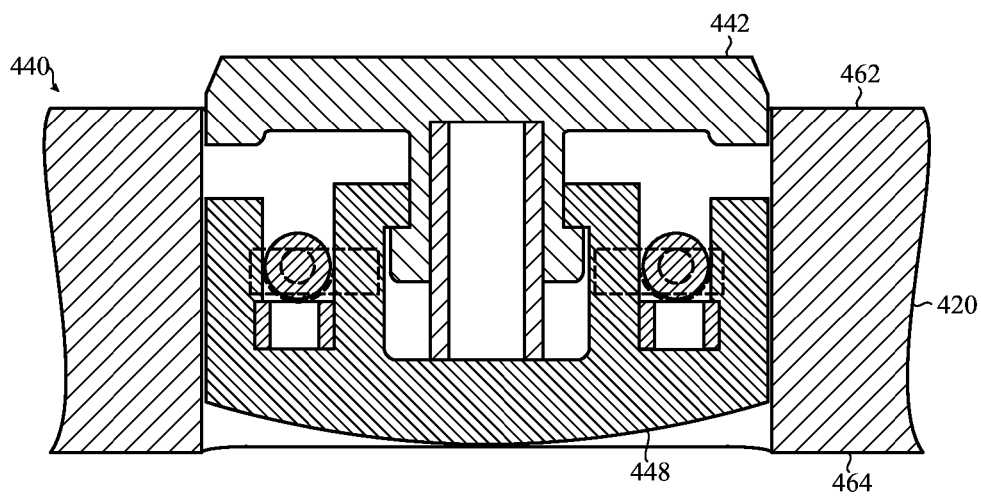

In some embodiments, the locking mechanism 440 may be configured to be placed in a variety of states, depending on the forces exerted on the mechanism while being inserted into a mating feature of a component. FIGS. 10A-C illustrate front cross-sectional view of a locking mechanism in various states as it is being engaged with a mating feature of a consumer product.

FIG. 10A illustrates an uncompressed state of the locking mechanism 440 of an example removable module 420. FIG. 10A may correspond to the state of the locking mechanism 440 when the removable module 420 is not engaged with a mating feature (e.g., a channel) of a mating component. As shown in FIG. 10A, a portion of the ramp member 448 protrudes beyond the lower surface 464 of the removable module 420. In particular, the ramp member 448 includes curved outer surface having a middle portion that protrudes beyond the lower surface 464 and side portions that are flush or nearly flush with the lower surface 464. The curved outer surface of the ramp member 448 may facilitate the installation of the removable module 420 by reducing or eliminating potential catch points as the body of the removable module is inserted into a mating feature, such as a channel.

As shown in FIG. 10A, in the uncompressed state of the locking mechanism 440, the catch member 442 is substantially flush or below flush with respect to the upper surface 462. As discussed above with respect to FIGS. 8A-B, the catch-retaining features and the ramp-retaining features prevent the upward or outward movement of the catch member 442, which may maintain the flush or below flush position when in an uncompressed state, as depicted in FIG. 10A. As shown in FIG. 10A, the catch member 442 may also include a chamfer or edge break around the perimeter of the upper surface of the catch member 442, which may reduce or eliminate potential catch points as the body of the removable module is inserted into a mating feature, such as a channel.

FIG. 10B illustrates an partially compressed state of the locking mechanism 440 of an example removable module 420. FIG. 10B may correspond to the state of the locking mechanism 440 when the removable module 420 is partially engaged with a mating feature (e.g., a channel) of a mating component. As shown in FIG. 10B, the ramp member 448 is flush or below flush with respect to the lower surface 464. As also shown in FIG. 10B, the catch member 442 is flush or below flush with respect to the upper surface 462.

FIG. 10C illustrates an engaged state of the locking mechanism 440 of an example removable module 420. FIG. 10C may correspond to the state of the locking mechanism 440 when the removable module 420 is fully engaged with or fully inserted into a mating feature (e.g., a channel) of a mating component. As shown in FIG. 10C, the ramp member 448 remains flush or below flush with respect to the lower surface 464. As also shown in FIG. 10C, a portion of the catch member 442 extends beyond the upper surface 462 of the removable module 420. As described in more detail with respect to FIGS. 12A-C and 13A, the extended catch member 442 may engage a corresponding feature, such as a recess or pocket formed in the wall of the mating feature or channel of the mating component. The engagement provided by the catch member 442 may prevent removable module 420 from sliding within the mating feature thereby retaining or locking the removable module 420 to the mating component.

Figure 11A:
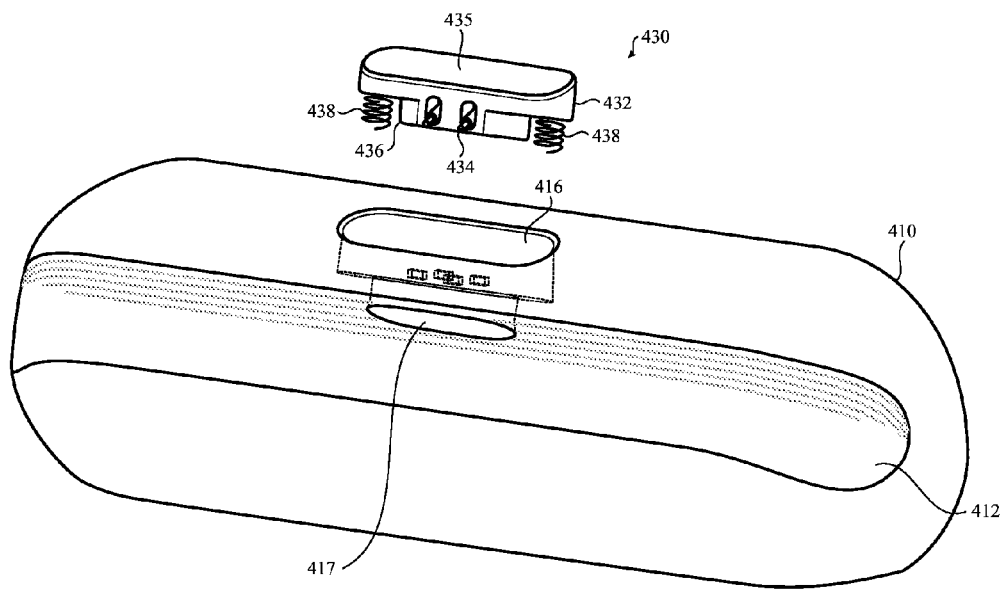
FIG. 11A illustrates an exploded view of release mechanism and a housing of a consumer product according to one or more embodiments of the present disclosure.
Figure 11B:
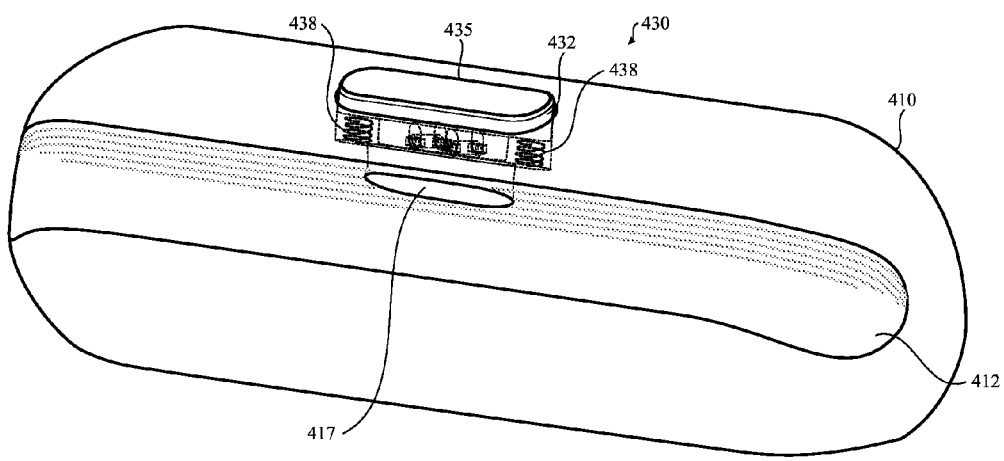
FIG. 11B illustrates an assembled release mechanism contained within the housing of the consumer product according to one or more embodiments of the present disclosure.

As previously discussed, an example attachment system may include a release mechanism for disengaging a locking mechanism of removable module. FIGS. 11A-B depict an example release mechanism installed in a housing of a consumer product. The release mechanism may be configured to disengages or release a locking mechanism of a removable module, in accordance with embodiments described herein. In particular, FIG. 11A illustrates an exploded view of an example release mechanism and FIG. 11B illustrates an assembled release mechanism.

As shown in FIGS. 11A-B, the release mechanism 430 includes a button member 432 at least partially disposed within an aperture 416 formed in the body of the housing 410. In the present embodiment, the aperture 416 is aligned with a recess 417 formed into the wall of the channel 412 and extends through to an upper surface of the housing 410. In the present example, the aperture 416 has a length that is greater than the length of the recess 417. However, in other embodiments, the length (or width) of the aperture 416 may be less than the length (or width) of the recess 417.

On the present embodiment, the button member 432 is configured to move up and down within the aperture 416 formed in the surface of the housing 410. The button member 432 may be at least partially retained by one or more spring bars 434 that are positioned within the aperture 416. The spring bars 434 may be received by an aperture feature formed in the button member 432 otherwise referred to an button aperture. In the present example, the spring bars 434 are received in respective elongated or slotted holes formed in the button member 432, as shown in FIG. 11A. In some embodiments, the feature of the button member 432 that engages the spring bars 434 is not an aperture and may be formed by one or more protrusions or other features formed into the button member 432. In some embodiments, the spring bars 434 limit the motion of the button member 432 in at least one direction. For example, the spring bars 434 may limit the upward or outward motion of the button member 432 to prevent the button member 432 from being completely removed from the aperture 416.

In the present example, a pair of spring bars 434 span across the width of the aperture 416 and are retained by respective recesses or pockets formed in the wall of the aperture 416. The configuration of the recesses or pockets in the aperture 416 may be similar to the recesses 466 described above with respect to FIGS. 9A-B. In particular, the recesses or pockets may be elongated along a direction perpendicular to an axis of the aperture 416 to facilitate installation of the spring bars by allowing for variations in the (horizontal) position of the spring bars 434 with respect to the axis of the aperture 416.

In the present example, two spring bars 434 are used to retain or capture the button member 432. However, in other embodiments, a single spring bar may be used or more than two spring bars may be used to retain or capture the button member 432 within the aperture 416. In some embodiments, the one or more spring bars 434 slidably engage a corresponding feature(s) formed into the button member 432 and help to guide the button member 432 as it moves up and down within the aperture 416.

Similar to the example described above with respect to FIGS. 7A-B, the spring bars 434 may include a spring-loaded mechanism that is configured to partially collapse when loaded and return to an extended position when unloaded. In some embodiments, the spring bar 434 includes a barrel portion and one or more spring-loaded protrusions that extend out from the end(s) of the barrel portion. In the present embodiment, the spring bars 434 are generally formed as a straight cylindrical shape. However, in other embodiments, the spring bars 434 may be formed from a curved cylindrical shape, bent cylindrical shape, or be formed from a variety of other types of shapes.

As shown in FIG. 11A, a pair of springs 438 are positioned between the button member 432 and a feature formed into the body of the housing 410. The springs 438 bias the button member 432 outward or upward away from the channel 412. In the embodiment of FIGS. 11A-B, each spring 438 is coupled between a lower surface of the button member 432 and a shoulder feature formed between the aperture 416 and the recess 417. In an alternative embodiment, the springs 438 may be disposed in a separate hole or recess that is formed into the body of the housing 410. In yet another alternative embodiment, one or more springs may be disposed between the button member 432 and another component coupled to the body of the housing 410. In some embodiments, the spring 438 may include a coil-type compression spring formed form a material such as steel, spring steel, stainless steel, music wire, plastic, bronze, and the like. Other types of springs may also be used including, for example, elastomeric members, foam members, spring clips, torsion springs, or any other component configured to provide a biasing force.

In some embodiments, there is no spring included in the release mechanism 430. That is, an internal spring is not used to bias the button member 432 outward or away from the channel 412. In such embodiments, the spring-loaded locking mechanism (e.g., 440 of FIGS. 7A-B) may provide a biasing force to the button member 432.

As shown in FIG. 11A, the button member 432 includes a actuation portion 435 and a plunger portion 436. The actuation portion 435 may include an upper part of the button member 432 that is configured to be actuated by the press of a finger. In some embodiments, the actuation portion 435 is sized to receive a finger press or actuation. In some embodiments, the actuation portion 435 is sized to receive or be actuated by a pointed object, such as a pen or pointed tool. In some embodiments, the actuation portion 435 protrudes slightly above the surface of the body of the housing 410. In some embodiments, the actuation portion 435 is flush or slightly below flush with respect to the body of the housing 410.

As shown in FIG. 11A, the button member 432 may also include a plunger portion 436 that is configured to enter the recess 417 and engage a catch member of a locking mechanism (e.g., item 442 of FIGS. 7A-B). In some embodiments, the plunger portion 436 may be sized to substantially fill the recess 417. In other embodiments, the plunger portion 436 may be significantly smaller than the recess 417. For example, in some embodiments, the plunger portion 436 may be formed from a cylindrical rod section or multiple cylindrical rod sections.

Figure 12A:
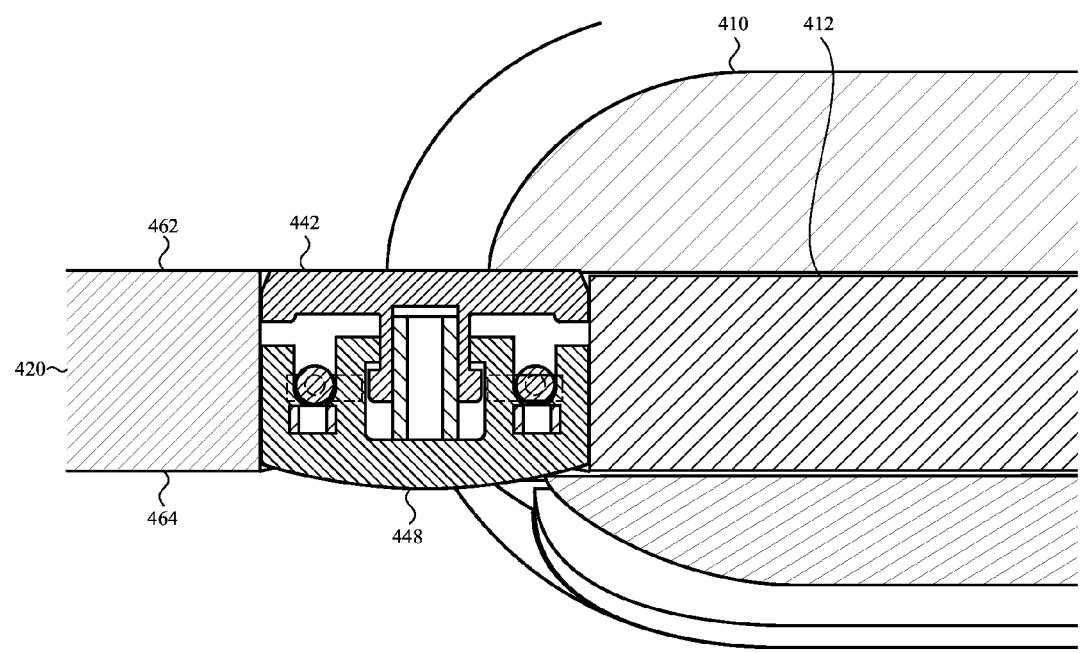
FIG. 12A illustrates a front cross-section view of a removable module being inserted into a channel of a housing of a consumer product taken along section A-A according to one or more embodiments of the present disclosure.
Figure 12B:
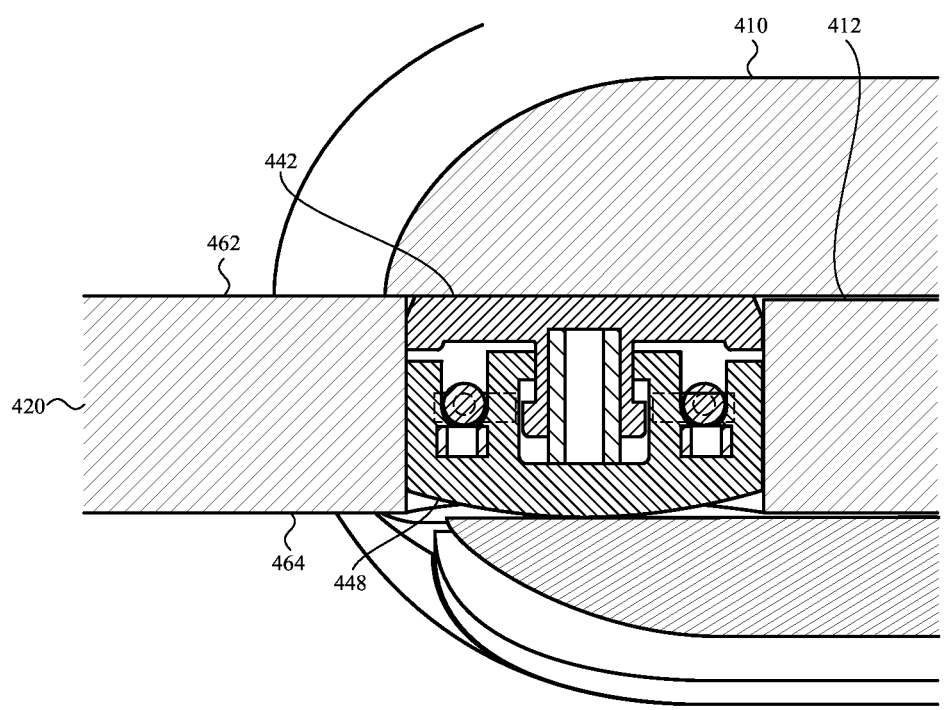
FIG. 12B illustrates a front cross-section view of the removable module further inserted into the channel of the housing of the consumer product such that a locking mechanism of the attachment system is in a compressed state taken along section A-A according to one or more embodiments of the present disclosure.
Figure 12C:
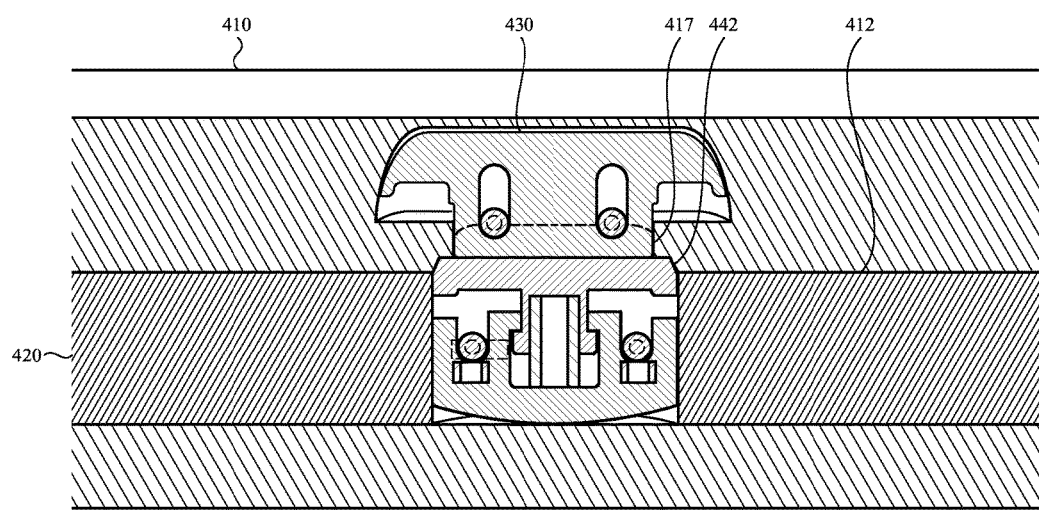
FIG. 12C illustrates a front cross-section view of the locking mechanism fully inserted into the channel of the housing in which a catch member of the locking mechanism is engaged with a recess formed in the channel of the housing of the consumer product taken along section A-A according to one or more embodiments of the present disclosure.

FIGS. 12A-C depict the relative movement of the locking mechanism 440 with respect to features formed in a housing 410 and the operation of the release mechanism 430. The sequence depicted in FIGS. 12A-C may be applicable to the embodiments described above, particularly FIGS. 4-11B. The cross-sectional views depicted in FIGS. 12A-C may correspond to section A-A of FIGS. 6A-C.

FIG. 12A illustrates a front cross-section view of a removable module 420 being inserted into a channel 412 of a housing 410 of a consumer product. The configuration depicted in FIG. 12A may correspond to an uncompressed state or condition of the locking mechanism. In an uncompressed state or condition, the catch member 442 may be substantially flush or below flush with respect to the upper surface 462. As shown in FIG. 12A, a portion of the ramp member 448 protrudes beyond the lower surface 464 of the removable module 420. In particular, the ramp member 448 includes curved outer surface having a middle portion that protrudes beyond the lower surface 464 and side portions that are flush or nearly flush with the lower surface 464. The curved outer surface of the ramp member 448 may facilitate the installation of the removable module 420 by reducing or eliminating potential catch points as the body of the removable module is inserted into a mating feature, such as a channel.

As shown in FIG. 12A, the ramp member 448 is in contact with an edge of the channel 412 formed in the housing 410. In the present embodiment, as the removable module 420 is inserted further into the channel 412, the ramp member 448 will be compressed or withdrawn into the aperture of the removable module 420 due to the contact with the channel 412. As shown in FIG. 12A, the curved shape of the lower surface of the ramp member 448 facilitates a smooth compression of the locking mechanism as the removable module 420 is being inserted.

Also, as shown in FIG. 12A, the catch member 442 is already engaged within the channel 412 as the ramp member 448 contacts the edge of the channel 412. Thus, as the ramp member 448 is compressed or withdrawn into the removable module 420, the catch member 442 will not protrude significantly beyond the upper surface 462 of the removable module 420 because it has already been at least partially inserted or engaged with the channel 412. As shown in FIG. 12A, an upper edge of the channel 412 may extend slightly beyond the lower edge of the channel 412 to engage the catch member 442 while it is still flush or nearly flush with respect to the upper surface 462.

FIG. 12B illustrates a front cross-section view of the attachment system partially inserted into the channel of the housing of the consumer product. The configuration depicted in FIG. 12B may correspond to the state or condition of the locking mechanism being compressed. As shown in FIG. 12B, the removable module 420 has been inserted into the channel 412 such that both the catch member 442 and the ramp member 448 are held within the channel 412. As shown in FIG. 12B the ramp member 448 is flush or below flush with respect to the lower surface 464. As also shown in FIG. 10B, the catch member 442 is flush or below flush with respect to the upper surface 462. The locking mechanism may remain in this compressed state as the removable module 420 is being inserted until the catch member 442 is aligned with a recess, as shown in FIG. 12C.

FIG. 12C illustrates a front cross-section view of the locking mechanism of the attachment system fully inserted into the channel of the housing in which a catch member of the locking mechanism is engaged with a recess formed in the channel of the housing of the consumer product. As shown in FIG. 12C, the ramp member 448 remains flush or below flush with respect to the lower surface 464. Also, as shown in FIG. 12C, a portion of the catch member 442 extends beyond the upper surface 462 of the removable module 420 and engages recess 417 formed into the housing 410. The engagement between the catch member 442 and the recess 417 may prevent removable module 420 from sliding within the channel 412 thereby retaining or locking the removable module 420 to the housing 410. In the present embodiment, the internal springs (e.g., second spring 447 of FIG. 7A) biases the catch member 442 toward the recess 417 thereby maintaining the engagement between the catch member 442 and the housing 410.

As shown in FIG. 12C, the release mechanism 430 is also positioned above the recess 417 and is depicted in an un-actuated or uncompressed state. When the release mechanism 430 is in an un-actuated or uncompressed state, the catch member 442 may remain at least partially inserted in the recess 417 maintaining the engagement between the locking mechanism of the removable module 420 with respect to the housing 410.

Figure 13A:
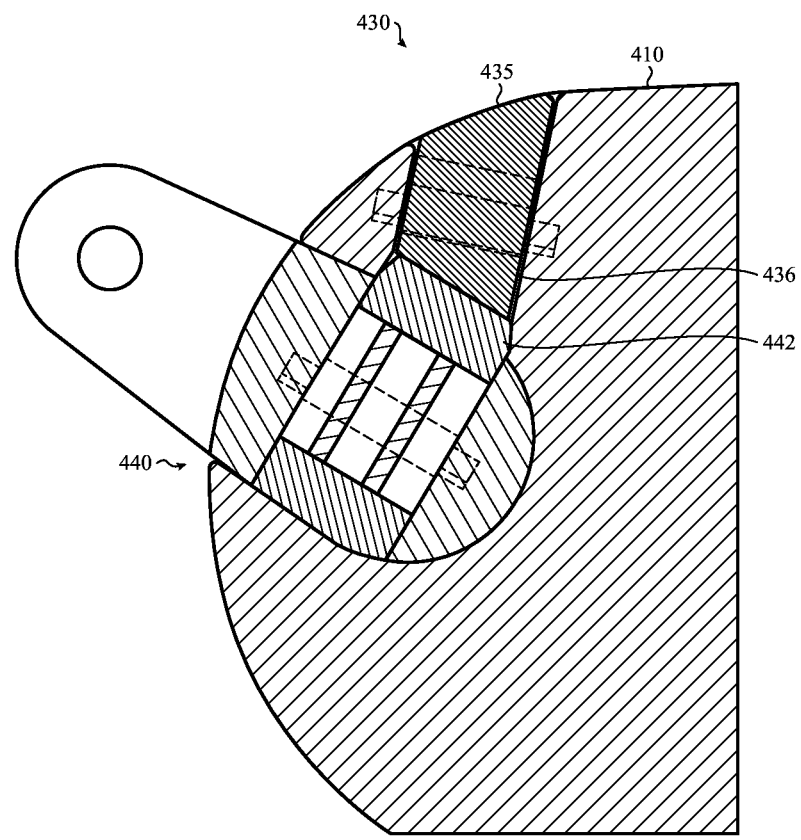
FIG. 13A illustrates a side cross-sectional view of a locking mechanism engaged with a housing of a consumer product taken along section B-B according to one or more embodiments of the present disclosure.
Figure 13B:
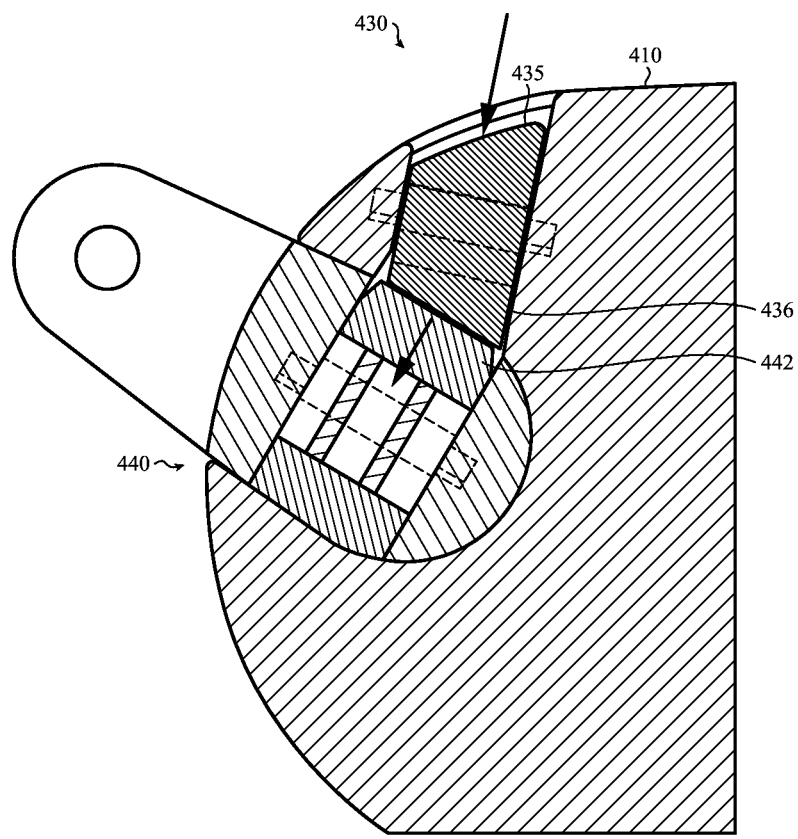
FIG. 13B illustrates actuation of a release mechanism of the housing of the consumer product taken along section B-B according to one or more embodiments of the present disclosure.

FIGS. 13A-B depict an example actuation of the release mechanism 430 in accordance with some embodiments. The cross-sectional views of FIGS. 13A-B correspond to section B-B depicted on FIG. 6C. In particular, FIG. 13A illustrates a side cross-sectional view of a locking mechanism 440 engaged with a housing 410 of a consumer product. In the state or configuration depicted in FIG. 13A, the catch member 442 is at least partially disposed within the recess formed within the housing 410. Also as shown in FIG. 13A, the release mechanism 430 is in an uncompressed or un-actuated state similar to the configuration depicted in the front cross-sectional view of FIG. 12C, discussed above. In the present embodiment, the plunger portion 436 of the button member is touching or nearly touching the top of the catch member 442. In some embodiments, the catch member 442 exerts an upward force on the plunger portion 436 of the button member.

FIG. 13B illustrates actuation of a release mechanism being actuated or compressed. As indicated by the arrow in FIG. 13B, a downward or inward actuation force may be applied to the actuation portion 435 of the release mechanism 430. The actuation force may cause the spring of the release mechanism 430 to compress and cause the button member to move downward or inward toward the channel formed in the housing 410. As shown in FIG. 13B, the downward or inward movement of the button member causes the plunger portion 436 compress the catch member 442 back into the aperture formed in the removable module. In some embodiments, the actuation of the release mechanism 430 causes the catch member 442 to be flush or below flush with respect to the upper surface of the removable module. In some implementations, the catch member 442 may still slightly protrude above the upper surface of the removable module when the release mechanism 430 is actuated. In the present embodiment, the actuation force must be great enough to overcome both the spring elements of the release mechanism (if any) and the spring elements of the locking mechanism used to bias the catch member 442 toward the recess formed in the housing 410.

In some implementations, the actuation of the release mechanism 430, as depicted in FIG. 13B allows the movement of the removable module within the channel of the housing 410. In particular, the release mechanism 430 may be actuated while simultaneously moving the removable module within the channel to prevent re-engagement between the catch member 442 and the recess in the housing 410. Once the catch member 442 and the recess are no longer aligned, the release mechanism 430 may be un-actuated or uncompressed and the removable module may be continued to be slideably disengaged from the housing 410.

Figure 14:
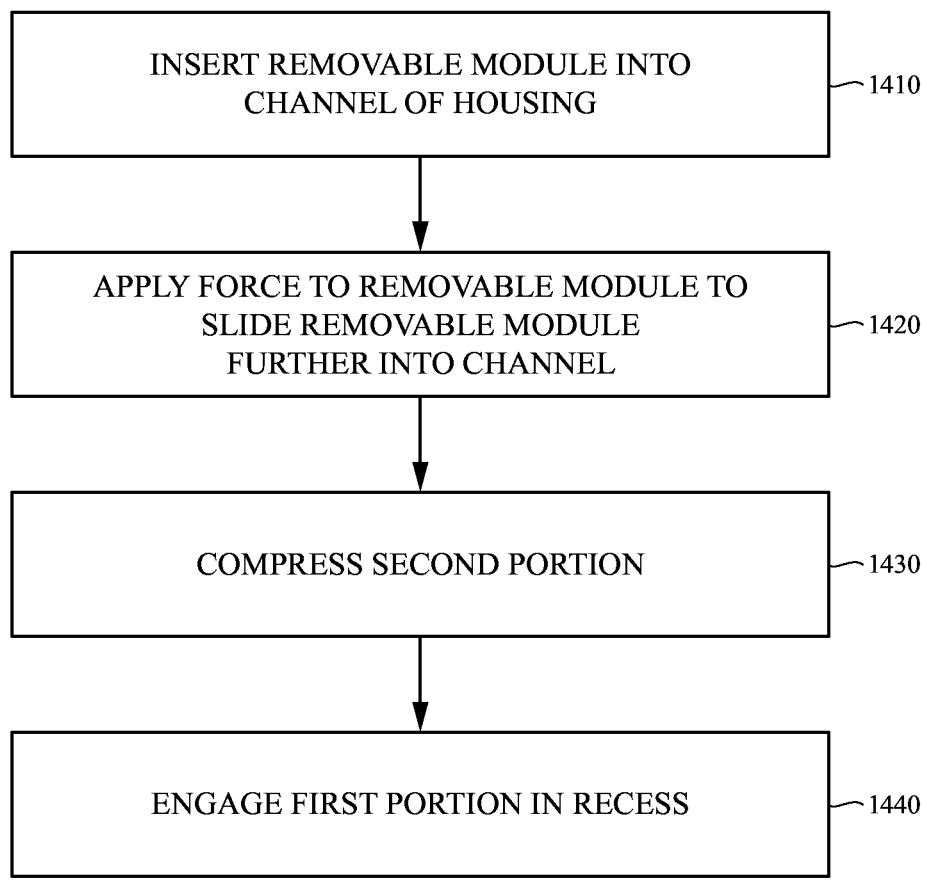
FIG. 14 illustrates an example process of inserting and securing a removable module to a consumer product according to one or more embodiments of the present disclosure.

FIG. 14 illustrates a process 1400 of inserting and securing a removable module into a channel of a housing or component of a consumer product according to one or more embodiments of the present disclosure. In some embodiments, the process 1400 may be used to insert various attachment systems into various channels, components, apertures, and the like such as described herein. For example, process 1400 may be used to insert the removable module 110, 420 into a channel 121, 412 of a housing 120, 410 shown and described with respect to FIGS. 1A-C and 4-13B, respectively. Although specific attachment systems and channels are described, the process 1400, or portions thereof, may be used to insert any of the attachment systems described herein into any of the channels of the various devices described herein.

In operation 1410, a removable module may be inserted into the channel of a housing or component. In some embodiments, the removable module has a body with a profile shape that is extruded or extended along a length of the body. Similarly, the housing or component may have a corresponding opening or feature having a similar profile shape that is extended along a length or direction. With regard to operation, the removable module may be inserted by sliding the body of the removable module into the opening in the housing along a direction that is substantially aligned with both the length of the body and the length of the opening.

As previously described, the removable module may include a spring-loaded locking mechanism. In some embodiments, a first portion of the locking mechanism may be spring-biased flush with respect to the attachment system. The first portion of the locking mechanism may correspond to the catch member described above with respect to the previous figures. A second portion of the locking mechanism may be spring-biased proud with respect the removable module. The second portion of the locking mechanism may correspond to the ramp member described above with respect to the previous figures. The locking mechanism may also include a first set of spring elements or mechanisms that cause the first portion of the locking mechanism and the second portion of the locking mechanism to be biased away from each other. In addition, a second set of spring elements or mechanisms may cause the second portion to be biased proud with respect to a surface of the removable module. The second set of spring elements or mechanisms may also cause the first portion of the locking mechanism to be biased flush with respect to the removable module.

In operation 1420, a force is applied to at least one side of the removable module. As the force is applied to the removable module, the removable module slides within the channel in generally the direction of the side force. In some embodiments, the first portion of the locking mechanism has a length that is substantially equal to, or slightly greater than, a length of the second portion of the locking mechanism. As such, as the removable module slides further into the housing, the first portion of the locking mechanism enters the channel prior to the second portion of the locking mechanism coming into contact with an outer edge of the channel. Alternatively, the channel may have a first edge that protrudes beyond a second edge resulting in the first portion of the locking mechanism engaging the first edge before the second portion of the locking mechanism engages the second edge. In either case, the channel may to keep the first portion of the locking mechanism in a compressed state even when the second portion of the locking mechanism is begins to enter a compressed state due to contact with the channel such as described above.

In operation 1430, the second portion of the locking mechanism of the removable module comes into contact with the channel. In some embodiments, when the second portion of the locking mechanism comes into contact with the channel and force is continually applied on the removable module, the channel causes the second portion of the locking mechanism to compress or withdraw into the removable module.

In some embodiments, as the removable module is further inserted into the channel, the first set of spring elements or mechanisms and a second set of spring elements or mechanisms enable the second portion of the locking mechanism to compress until the second portion of the locking mechanism is contained within the removable module or at least until the second portion of the locking mechanism is contained within the channel. Although the first and the second set of spring elements or mechanisms are compressed, and although the first set of spring elements or mechanisms cause the first portion of the locking mechanism to be biased away from the second portion of the locking mechanism, the first portion of the locking mechanism is contained within the channel which prohibits the first portion of the locking mechanism from expanding. Therefore, the locking mechanism may remain in a compressed state. In some embodiments, the locking mechanism remains in the compressed state as the removable module continues to slide within the channel. However, when the locking mechanism is in proximity to, or beneath a recess contained in the channel, the flow of process 1400 may proceed to operation 1440 and the locking mechanism may expand or extend into a recess of the housing.

In operation 1440, the first portion of the locking mechanism aligns with and engages the recess in the channel. In some embodiments, the first set of spring elements mechanisms of the locking mechanism expand. The expansion of the first set of spring elements or mechanisms causes the first portion to move in a direction toward the recess. When the first portion of the locking mechanism is in the recess, the removable module may be locked in place. Although the first portion of the locking mechanism is in an expanded state (e.g., a state in which a portion of the first portion of the locking mechanism extends beyond the removable module), one or more embodiments provide that the second portion of the locking mechanism remains in a contracted or withdrawn state due to continued contact with the channel of the housing.

In some embodiments, the removable module may be retained or locked with respect to the housing until the first portion is disengaged or released with respect to the recess in the channel of the housing. In some embodiments, the resulting engagement of the removable module with respect to the housing results in a secure connection between the housing of a device and an accessory such as a band, strap, or other attachment accessory.

Figure 15:
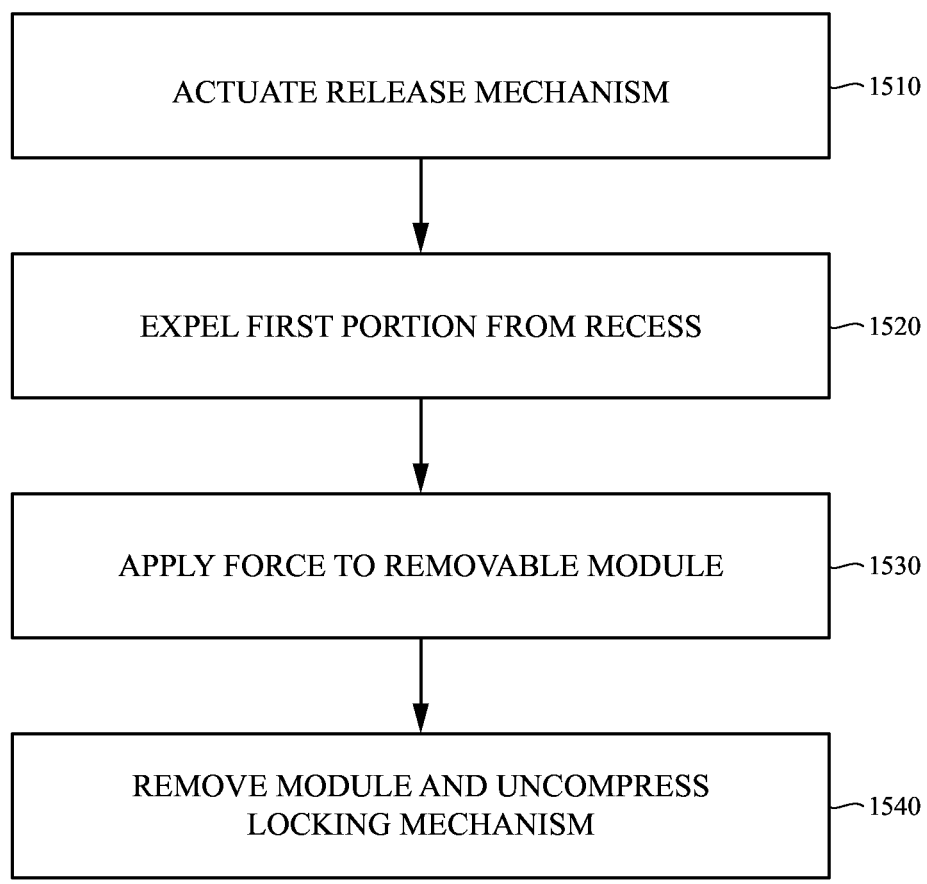
FIG. 15 illustrates an example process of removing a removable module from a consumer product according to one or more embodiments of the present disclosure.

FIG. 15 illustrates an example process 1500 of removing an removable module from a housing or component of a consumer product according to one or more embodiments of the present disclosure. In some embodiments, the process 1500 may be used to remove various removable modules from various channels such as described herein. For example, process 1500 may be used to disengage a locking mechanism of the removable module 110, 420 from the channel 121, 412 of a housing 120, 410 shown and described with respect to FIGS. 1A-C and 4-13B, respectively. Although specific removable modules and channels are described, the process 1500, or portions thereof, may be used to remove any of the removable modules described herein from any of the channels, components, apertures, housings, and the like described herein.

In operation 1510, a release mechanism on a housing of a consumer product is actuated. The release mechanism may be actuated, for example, by applying a force to an actuation portion or first portion of the release mechanism using an object, such as a finger or tool. In some embodiments, when a first portion of the release mechanism is actuated, a spring mechanism in the release mechanism compresses and enables the first portion of the release mechanism to move within an opening in the housing. In some embodiments, the first portion of the release mechanism corresponds to the actuation portion described with respect to the previous figures. The actuation of the first portion may also cause a second portion of the release mechanism to move from a first position in a recess of a channel in the housing to a second position within the recess of the channel. In some embodiments, the second portion of the release mechanism corresponds to the plunger portion described above with respect to the previous figures.

In operation 1520, the movement of the release mechanism may cause the second portion of the release mechanism to expel a first portion of a locking mechanism of an removable module from the recess. As previously discussed with respect to FIGS. 13A-B, the second portion of the release mechanism may depress the first portion of the locking mechanism to be flush or nearly flush with a surface of the removable module, thereby disengaging the locking mechanism from the housing.

Once the first portion of the locking mechanism has been expelled from the recess, in operation 1530, a force may be applied to the removable module to move the removable module within the channel. For example, when the first portion of the release mechanism is actuated, spring elements or mechanisms in the release mechanism may compress and enable the first portion to move within the housing. Actuation of the first portion of the release mechanism may also cause the second portion of the release mechanism to move from a first position in the recess to a second position within the recess. As the second portion of the release mechanism moves from the first position to the second position, the second portion of the release mechanism may cause a spring element or mechanism in the locking mechanism to compress. The compression may result in the first portion of the locking mechanism to be removed from the recess. Once the first portion of the locking mechanism has been removed from the recess, the removable module may move within the channel in a direction of applied force.

In operation 1540, the removable module may be removed from the channel and a second portion of the locking mechanism of the removable module may expand. In some implementations, when the second portion of the locking mechanism is removed from the channel of the housing of the consumer product, the second spring elements or mechanism may cause the second portion of the locking mechanism to be biased proud with respect to the removable module while causing the first portion of the locking mechanism to be biased flush or substantially flush with respect to the removable module.

In some embodiments, the result of process 1500 is that band, strap, or other attachment accessory is detached from the housing of a device. In some embodiments, process 1500 may be used to detach a first type of band, strap, or other attachment accessory and process 1400 can be used to attach a different, second type of band, strap, or other attachment accessory. In some embodiments, the attachment systems and methods described herein may be used to create an interchangeable system of components and accessories that can be attached to a consumer product. The interchangeable components or accessories may alter the functionality and/or appearance of the consumer product and thereby expand the applicability or use of a particular consumer product.

Figure 16:
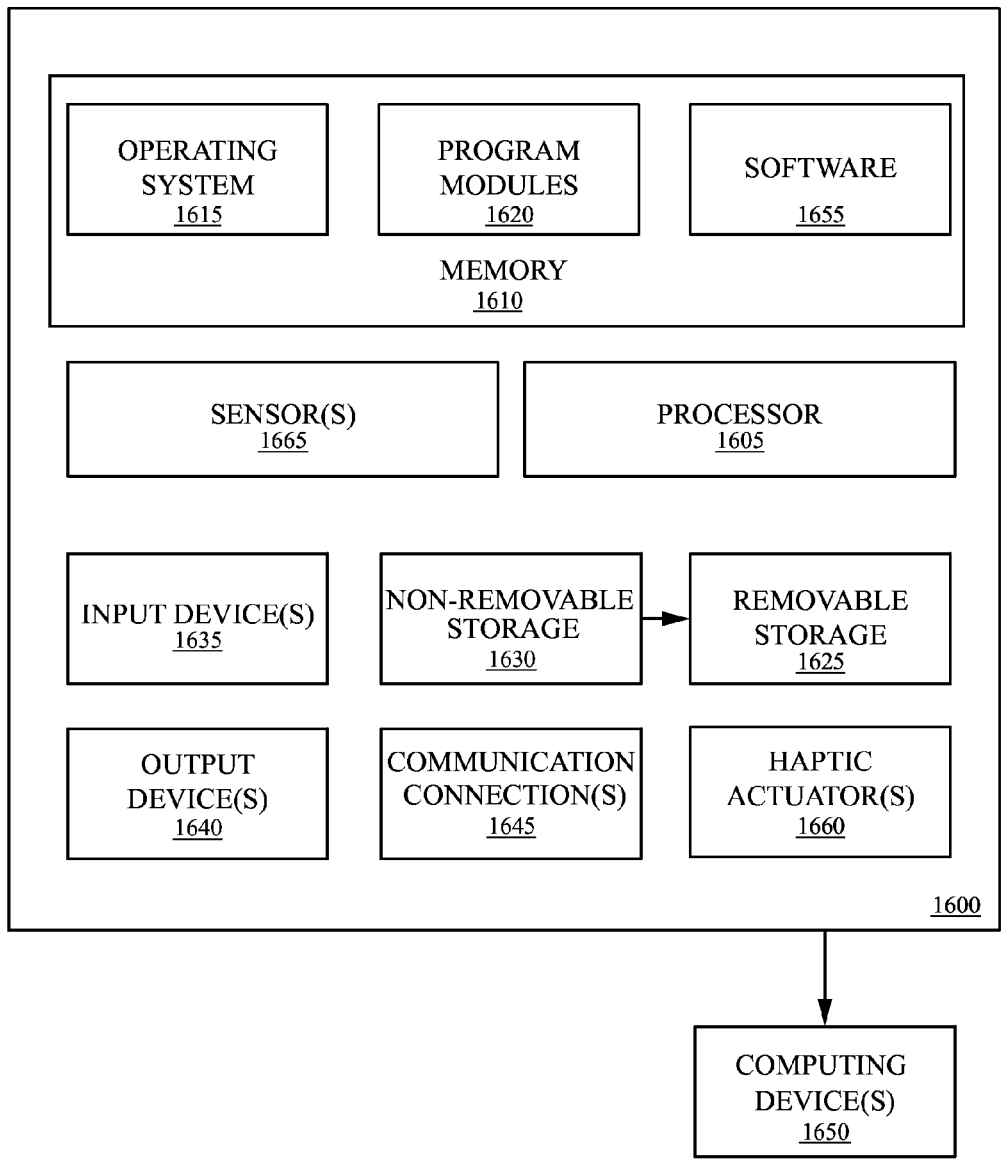
FIG. 16 is a block diagram illustrating example physical components of a consumer product that may be used with one or more embodiments of the present disclosure.

FIG. 16 is a block diagram illustrating exemplary components, such as, for example, hardware components of an consumer product 1600 according to one or more embodiments of the present disclosure. In certain embodiments, the consumer product 1600 may be similar to the consumer product 118 and 400 described above with respect to FIGS. 1A-B and 4, respectively. Although various components of the consumer product 1600 are shown, connections and communication channels between each of the components are omitted for simplicity.

In a basic configuration, the consumer product 1600 may include at least one processor 1605 and an associated memory 1610. The memory 1610 may comprise, but is not limited to, volatile storage such as random access memory, non-volatile storage such as read-only memory, flash memory, or any combination thereof. The memory 1610 may store an operating system 1615 and one or more program modules 1620 suitable for running software applications 1655. The operating system 1615 may be configured to control the consumer product 1600 and/or one or more software applications 1655 being executed by the operating system 1615. The software applications 1655 may include browser applications, e-mail applications, calendaring applications, contact manager applications, messaging applications, games, media player applications, time keeping applications, and the like.

The consumer product 1600 may have additional features or functionality than those expressly described herein. For example, the consumer product 1600 may also include additional data storage devices, removable and non-removable, such as, for example, magnetic disks, optical disks, or tape. Exemplary storage devices are illustrated in FIG. 16 by removable storage device 1625 and a non-removable storage device 1630. In certain embodiments, various program modules and data files may be stored in the system memory 1610.

As also shown in FIG. 16, the consumer product 1600 may include one or more input devices 1635. The input devices 1635 may include a keyboard, a mouse, a pen or stylus, a sound input device, a touch input device, and the like. The consumer product 1600 may also include one or more output devices 1640. The output devices 1640 may include a display, one or more speakers, a printer, and the like. The consumer product 1600 may also include one or more haptic actuators 1660 that are used to provide the haptic feedback. In some embodiments, the consumer product 1600 may also include one or more sensors 1665. The sensors 1665 may include, but are not limited to, accelerometers, ambient light sensors, gyroscopes, magnetometers, and other types of sensors.

The consumer product 1600 may also include communication connections 1645 that facilitate communications with additional computing devices 1650. Such communication connections 1645 may include a RF transmitter, a receiver, and/or transceiver circuitry, universal serial bus (USB) communications, parallel ports, and/or serial ports.

As used herein, the term computer readable media may include computer storage media. Computer storage media may include volatile and nonvolatile media and/or removable and non-removable media implemented in any method or technology for the storage of information. Examples include computer-readable instructions, data structures, or program modules. The memory 1610, the removable storage device 1625, and the non-removable storage device 1630 are all examples of computer storage media. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the consumer product 1600. Any such computer storage media may be part of the consumer product 1600.

The consumer product 1600 may also include a synchronization application or module (not shown) configured to synchronize applications or data resident on the consumer product 1600 with another computer or device.

In some embodiments, the consumer product 1600 includes a power supply such as a battery, a solar cell, and the like that provides power to each of the components shown. The power supply may also include an external power source, such as an AC adapter or other such connector that supplements or recharges the batteries. The consumer product 1600 may also include a radio that performs the function of transmitting and receiving radio frequency communications. Additionally, communications received by the radio may be disseminated to the application programs. Likewise, communications from the application programs may be disseminated to the radio as needed.

The consumer product 1600 may also include a visual indicator, a keypad and a display. In embodiments, the keypad may be a physical keypad or a virtual keypad generated on a touch screen display. The visual indicator may be used to provide visual notifications to a user of the consumer product. The consumer product 1600 may also include an audio interface for producing audible notifications and alerts. In certain embodiments, the visual indicator is a light emitting diode (LED) or other such light source and the audio interface is a speaker. In certain embodiments, the audio interface may be configured to receive audio input.

The audio interface may also be used to provide and receive audible signals from a user of the consumer product 1600. For example, a microphone may be used to receive audible input. In accordance with embodiments of the present disclosure, the microphone may also serve as an audio sensor to facilitate control of notifications such as described above. The system may further include a video interface that enables an operation of an on-board camera to record still images, video, and the like.

In one or more embodiments, data and information generated or captured by the consumer product may be stored locally. Additionally or alternatively, the data may be stored on any number of storage media that may be accessed by the consumer product using the radio, a wired connection or a wireless connection between the consumer product and a remote computing device. Additionally, data and information may be readily transferred between computing devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

Further, regardless of whether the features shown and described herein are shown and described in combination or separately, the various features, including structural features and methodological features, are intended to be selectively included or omitted to produce an embodiment with a particular set of features. Further, the directions and orientations described above may be reversed. For example a top portion or surface in one embodiment may be a bottom portion or surface in another embodiment. Likewise, a bottom portion or surface in one embodiment may be a top surface or portion in another embodiment. Having been provided with the description and illustration of the present application, one skilled in the art may envision variations, modifications, and alternate embodiments falling within the spirit of the broader aspects of the embodiments described herein that do not depart from the broader scope of the claimed embodiments.

Further, embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

We claim:

1. A removable module for a watch, the removable module comprising:
   a catch member disposed within an aperture of the removable module and configured to protrude from a first surface of the removable module;
   a ramp member disposed within the aperture and configured to protrude from a second surface of the removable module that is opposite to the first surface;
   a spring bar positioned within and spanning across a width of the aperture; a first spring coupled between the spring bar and the ramp member, the first spring biasing the ramp member away from the spring bar; and
   a second spring coupled between the ramp member and the catch member, the second spring biasing the catch member away from the ramp member.

2. The removable module of claim 1, wherein:
   the removable module is configured to slidably engage with a mating feature of the watch.

3. The removable module of claim 2, wherein the catch member is configured to protrude outward from the aperture and engage a recess formed in the mating feature of the watch to retain the removable module with respect to the watch.

4. The removable module of claim 2, wherein:
   when the removable module is not engaged with the mating feature of the watch:
      the catch member is flush with or below the first surface; and
      a portion of the ramp member extends beyond the second surface; when the removable module is partially engaged with the mating feature of the watch:
      the catch member is flush or below the first surface; and
      the ramp member is flush or below the second surface; and
   when the removable module is fully engaged with the mating feature of the watch:
      a portion of the catch member extends beyond the first surface and engages a recess formed in the mating feature; and
      the ramp member is flush or below the second surface.

5. The removable module of claim 2, wherein:
   the mating feature of the watch has an opening width at an opening of the mating feature and a maximum width within the feature being greater than the opening width;
   the removable module has a first portion having a first thickness that is smaller than the opening width of the opening and a second thickness that is less than the maximum width of the feature and greater than the opening width; and
   the opening width of the mating feature is configured to limit movement of the removable module in a direction perpendicular to opening.

6. The removable module of claim 1, wherein the spring bar comprises:
   a barrel portion; and
   a spring-loaded protrusion that extends out from an end of the barrel portion, wherein the spring-loaded protrusion is configured to engage a corresponding recess formed in a wall of the aperture.

7. The removable module of claim 1, wherein a retaining feature formed within the aperture limits an outward movement of the ramp member, wherein the retaining feature includes a protrusion that projects inward from a wall of the aperture.

8. The removable module of claim 1, wherein:
   the ramp member includes a ramp-retaining feature that engages a catch-retaining feature of the catch member; and
   engagement between the ramp-retaining feature and the catch-retaining feature limits outward movement of the catch member.

9. A watch comprising:
   a housing; and
   a watch band comprising:
      a catch member disposed within an aperture of the watch band and configured to protrude from a first surface of the watch band;
      a ramp member disposed within the aperture and configured to protrude from a second surface of the watch band that is opposite to the first surface;
      a spring bar positioned within and spanning across a width of the aperture;
      a first spring coupled between the spring bar and the ramp member, the first spring biasing the ramp member away from the spring bar; and
      a second spring coupled between the ramp member and the catch member, the second spring biasing the catch member away from the ramp member.

10. The watch of claim 9, wherein:
    the watch band is configured to slidably engage with a mating feature of the watch.

11. The watch of claim 10, wherein the catch member is configured to protrude outward from the aperture and engage a recess formed in the mating feature of the watch to retain the watch band with respect to the watch.

12. The watch of claim 10, wherein:
    when the watch band is not engaged with the mating feature of the watch:
       the catch member is flush with or below the first surface; and
       a portion of the ramp member extends beyond the second surface;

when the watch band is partially engaged with the mating feature of the watch:
   the catch member is flush or below the first surface; and
   the ramp member is flush or below the second surface; and
when the watch band is fully engaged with the mating feature of the watch:
   a portion of the catch member extends beyond the first surface and engages a recess formed in the mating feature; and
   the ramp member is flush or below the second surface.

13. The watch of claim 10, wherein:
the mating feature of the watch has an opening width at an opening of the feature and a maximum width within the feature being greater than the opening width;
the watch band has a first portion having a first thickness that is smaller than the opening width of the opening and a second thickness that is less than the maximum width of the feature and greater than the opening width; and
the opening width of the mating feature is configured to limit movement of the watch band in a direction perpendicular to opening.

14. The watch of claim 9, wherein the spring bar comprises:
a barrel portion; and
a spring-loaded protrusion that extends out from an end of the barrel portion, wherein the spring-loaded protrusion is configured to engage a corresponding recess formed in a wall of the aperture.

15. The watch of claim 9, wherein a retaining feature formed within the aperture limits an outward movement of the ramp member, wherein the retaining feature includes a protrusion that projects inward from a wall of the aperture.

16. A watch band for a watch, the watch band comprising:
a first surface;
a second surface opposite to the first surface;
an aperture extending from the first surface to the second surface;
a catch member;
a ramp member;
a spring bar positioned within and spanning across a width of the aperture;
a first spring coupled between the spring bar and the ramp member, the first spring biasing the ramp member away from the spring bar; and
a second spring coupled between the ramp member and the catch member, the second spring biasing the catch member away from the ramp member.

17. The watch band of claim 16, wherein:
the watch band is configured to slidably engage with a mating feature of the watch.

18. The watch band of claim 17, wherein the catch member is configured to protrude outward from the aperture and engage a recess formed in the mating feature of the watch to retain the watch band with respect to the watch.

19. The watch band of claim 17, wherein:
when the watch band is not engaged with the mating feature of the watch: the catch member is flush with or below the first surface; and
a portion of the ramp member extends beyond the second surface; when the watch band is partially engaged with the mating feature of the watch:
the catch member is flush or below the first surface; and
the ramp member is flush or below the second surface; and
when the watch band is fully engaged with the mating feature of the watch: a portion of the catch member extends beyond the first surface and
engages a recess formed in the mating feature; and
the ramp member is flush or below the second surface.

20. The watch of claim 16, wherein the spring bar comprises:
a barrel portion; and
a spring-loaded protrusion that extends out from an end of the barrel portion, wherein the spring-loaded protrusion is configured to engage a corresponding recess formed in a wall of the aperture.

* * * * *